(12) United States Patent
Ross et al.

(10) Patent No.: US 10,192,140 B2
(45) Date of Patent: Jan. 29, 2019

(54) DATABASE FOR DETECTING COUNTERFEIT ITEMS USING DIGITAL FINGERPRINT RECORDS

(71) Applicant: Alitheon, Inc., Redmond, WA (US)

(72) Inventors: David Justin Ross, Redmond, WA (US); Brian J. Elmenhurst, Redmond, WA (US); Mark Tocci, Redmond, WA (US); John Forbes, Redmond, WA (US); Heather Wheelock Ross, Redmond, WA (US)

(73) Assignee: Alitheon, Inc., Redmond, WA (US)

( * ) Notice: Subject to any disclaimer, the term of this patent is extended or adjusted under 35 U.S.C. 154(b) by 0 days.

(21) Appl. No.: 15/208,339

(22) Filed: Jul. 12, 2016

(65) Prior Publication Data

US 2016/0335520 A1 Nov. 17, 2016

Related U.S. Application Data

(60) Division of application No. 14/531,724, filed on Nov. 3, 2014, now Pat. No. 9,443,298, which is a
(Continued)

(51) Int. Cl.
 *G06K 9/00* (2006.01)
 *G06K 9/62* (2006.01)
 (Continued)

(52) U.S. Cl.
 CPC ....... *G06K 9/6202* (2013.01); *G06K 9/00449* (2013.01); *G06K 9/00744* (2013.01);
 (Continued)

(58) Field of Classification Search
 CPC ............ G06K 9/00449; G06K 9/6202; G06K 9/3216; G06K 9/00744; G06K 9/482; G09C 5/00; G06T 7/0004; G06T 1/005; G06T 2201/0065; G06T 2207/30204; G06T 2207/30164; G06T 2207/30148; G06T 2207/30128; G06T 2207/30144; G06Q 50/32; H04L 9/3247
 (Continued)

(56) References Cited

U.S. PATENT DOCUMENTS 4,218,674 A 8/1980 Brosow
4,423,415 A 12/1983 Goldman
(Continued)

FOREIGN PATENT DOCUMENTS

DE 102006 005927 A1 8/2007
EP 0 439 669 A2 8/1991
(Continued)

OTHER PUBLICATIONS

Buchanan et al., "Fingerprinting1 documents and packaging," Nature 43(5(7050):475, 2005.*
(Continued)

*Primary Examiner* — Gregory F Cunningham
(74) *Attorney, Agent, or Firm* — Seed IP Law Group LLP

(57) ABSTRACT

Improvements are disclosed for detecting counterfeit objects, based on comparison to digital fingerprints that describe features found in images of objects known to be counterfeit.

10 Claims, 14 Drawing Sheets

Related U.S. Application Data continuation-in-part of application No. 14/290,653, filed on May 29, 2014, now Pat. No. 9,350,552, which is a continuation of application No. 13/410,753, filed on Mar. 2, 2012, now Pat. No. 8,774,455.

(60) Provisional application No. 61/914,722, filed on Dec. 11, 2013, provisional application No. 61/898,780, filed on Nov. 1, 2013.

(51) Int. Cl.

| | | |
|---|---|---|
| *G06T 7/00* | (2017.01) | |
| *G06T 1/00* | (2006.01) | |
| *G06K 9/32* | (2006.01) | |
| *H04L 9/32* | (2006.01) | |
| *G06K 9/20* | (2006.01) | |
| *G09C 5/00* | (2006.01) | |
| *G06K 9/48* | (2006.01) | |
| *G06Q 50/32* | (2012.01) | |

(52) U.S. Cl.
CPC ......... *G06K 9/2063* (2013.01); *G06K 9/3216* (2013.01); *G06K 9/482* (2013.01); *G06T 1/005* (2013.01); *G06T 7/0004* (2013.01); *G09C 5/00* (2013.01); *H04L 9/3247* (2013.01); *G06Q 50/32* (2013.01); *G06T 2201/0065* (2013.01); *G06T 2207/30128* (2013.01); *G06T 2207/30144* (2013.01); *G06T 2207/30148* (2013.01); *G06T 2207/30164* (2013.01); *G06T 2207/30204* (2013.01)

(58) Field of Classification Search
USPC ......................................................... 382/100
See application file for complete search history.

(56) References Cited

U.S. PATENT DOCUMENTS

| | | | |
|---|---|---|---|
| 4,677,435 A | 6/1987 | Causse D'Agraives | |
| 4,921,107 A | 5/1990 | Hofer | |
| 5,031,223 A | 7/1991 | Rosenbaum | |
| 5,079,714 A | 1/1992 | Manduley | |
| 5,393,939 A | 2/1995 | Nasuta, Jr. | |
| 5,422,821 A | 6/1995 | Allen | |
| 5,514,863 A | 5/1996 | Williams | |
| 5,518,122 A | 5/1996 | Tilles | |
| 5,703,783 A | 12/1997 | Allen et al. | |
| 5,719,939 A | 2/1998 | Tel | |
| 5,734,568 A | 3/1998 | Borgendale | |
| 5,745,590 A | 4/1998 | Pollard | |
| 5,883,971 A | 3/1999 | Bolle | |
| 5,923,848 A | 7/1999 | Goodhand | |
| 5,974,150 A | 10/1999 | Kaish | |
| 6,246,794 B1 | 6/2001 | Kagehiro | |
| 6,292,709 B1 | 9/2001 | Uhl | |
| 6,327,373 B1 | 12/2001 | Yura | |
| 6,343,327 B2 | 1/2002 | Daniels, Jr. | |
| 6,360,001 B1 | 3/2002 | Berger | |
| 6,370,259 B1 | 4/2002 | Hobson | |
| 6,424,728 B1 | 7/2002 | Ammar | |
| 6,434,601 B1 | 8/2002 | Rollins | |
| 6,470,091 B2 | 10/2002 | Koga | |
| 6,539,098 B1 | 3/2003 | Baker | |
| 6,549,892 B1 | 4/2003 | Sansone | |
| 6,697,500 B2 | 2/2004 | Woolston | |
| 6,741,724 B1 | 5/2004 | Bruce | |
| 6,768,810 B2 | 7/2004 | Emanuelsson | |
| 6,778,703 B1 | 8/2004 | Zlotnick | |
| 6,805,926 B2 | 10/2004 | Cote et al. | |
| 6,816,602 B2 | 11/2004 | Coffelt | |
| 6,829,369 B2 | 12/2004 | Poulin | |
| 6,985,926 B1 | 1/2006 | Ferlauto | |
| 7,016,532 B2 | 3/2006 | Boncyk | |
| 7,096,152 B1 | 8/2006 | Ong | |
| 7,121,458 B2 | 10/2006 | Avant | |
| 7,171,049 B2 | 1/2007 | Snapp | |
| 7,204,415 B2 | 4/2007 | Payne | |
| 7,212,949 B2 | 5/2007 | Bachrach | |
| 7,356,162 B2 | 4/2008 | Caillon | |
| 7,436,979 B2 | 10/2008 | Bruce | |
| 7,477,780 B2 | 1/2009 | Boncyk | |
| 7,518,080 B2 | 4/2009 | Amato | |
| 7,602,938 B2 | 10/2009 | Proloski | |
| 7,674,995 B2 | 3/2010 | Desprez | |
| 7,680,306 B2 | 3/2010 | Boutant | |
| 7,720,256 B2 | 5/2010 | Desprez | |
| 7,726,548 B2 | 6/2010 | deLaVergne | |
| 7,822,263 B1 | 10/2010 | Proloski | |
| 7,834,289 B2 | 11/2010 | Orbke | |
| 7,853,792 B2 | 12/2010 | Cowburn | |
| 8,022,832 B2 | 9/2011 | Vogt | |
| 8,108,309 B2 | 1/2012 | Tan | |
| 8,180,174 B2 | 5/2012 | Di Venuto | |
| 8,180,667 B1 | 5/2012 | Baluja | |
| 8,194,938 B2 | 6/2012 | Wechsler | |
| 8,391,583 B1 | 3/2013 | Mennie et al. | |
| 8,428,772 B2 | 4/2013 | Miette | |
| 8,437,530 B1 | 5/2013 | Mennie et al. | |
| 8,477,992 B2 | 7/2013 | Paul | |
| 8,520,888 B2 | 8/2013 | Spitzig | |
| 8,526,743 B1 | 9/2013 | Campbell | |
| 8,774,455 B2 | 7/2014 | Elmenhurst | |
| 9,031,329 B1 | 5/2015 | Farid | |
| 9,058,543 B2 | 6/2015 | Campbell | |
| 9,152,862 B2 | 10/2015 | Ross | |
| 9,234,843 B2 | 1/2016 | Sopori et al. | |
| 9,245,133 B1 * | 1/2016 | Durst | G06K 19/086 |
| 9,646,206 B2 | 5/2017 | Ross et al. | |
| 2001/0010334 A1 | 8/2001 | Park | |
| 2001/0054031 A1 | 12/2001 | Lee | |
| 2002/0015515 A1 | 2/2002 | Lichtermann | |
| 2002/0168090 A1 | 11/2002 | Bruce | |
| 2003/0046103 A1 | 3/2003 | Amato | |
| 2003/0091724 A1 | 5/2003 | Mizoguchi | |
| 2003/0120677 A1 | 6/2003 | Vernon | |
| 2003/0179931 A1 | 9/2003 | Sun | |
| 2003/0182018 A1 | 9/2003 | Snapp | |
| 2003/0208298 A1 | 11/2003 | Edmonds | |
| 2004/0027630 A1 | 2/2004 | Lizotte | |
| 2004/0112962 A1 | 6/2004 | Farrall | |
| 2004/0218791 A1 | 11/2004 | Jiang | |
| 2004/0218801 A1 | 11/2004 | Houle | |
| 2005/0065719 A1 | 3/2005 | Khan | |
| 2005/0086256 A1 | 4/2005 | Owens | |
| 2005/0119786 A1 | 6/2005 | Kadaba | |
| 2005/0131576 A1 | 6/2005 | DeLeo | |
| 2005/0160271 A9 | 7/2005 | Brundage et al. | |
| 2005/0188213 A1 | 8/2005 | Xu | |
| 2005/0251285 A1 | 11/2005 | Boyce | |
| 2005/0257064 A1 | 11/2005 | Boutant | |
| 2006/0010503 A1 | 1/2006 | Inoue et al. | |
| 2006/0083414 A1 | 4/2006 | Neumann | |
| 2006/0131518 A1 | 6/2006 | Ross | |
| 2006/0177104 A1 | 8/2006 | Prokoski | |
| 2006/0253406 A1 | 11/2006 | Caillon | |
| 2007/0085710 A1 * | 4/2007 | Bousquet | G06F 17/30539 341/50 |
| 2007/0094155 A1 | 4/2007 | Dearing | |
| 2007/0263267 A1 | 11/2007 | Ditt | |
| 2007/0282900 A1 | 12/2007 | Owens | |
| 2008/0011841 A1 | 1/2008 | Self | |
| 2008/0130947 A1 | 6/2008 | Ross | |
| 2008/0219503 A1 | 9/2008 | DiVenuto | |
| 2008/0250483 A1 | 10/2008 | Lee | |
| 2008/0255758 A1 | 10/2008 | Graham | |
| 2008/0272585 A1 | 11/2008 | Conard | |
| 2008/0294474 A1 | 11/2008 | Furka | |
| 2009/0028379 A1 | 1/2009 | Belanger | |
| 2009/0057207 A1 | 3/2009 | Orbke | |
| 2009/0106042 A1 | 4/2009 | Maytal | |
| 2009/0154778 A1 | 6/2009 | Lei | |
| 2009/0157733 A1 | 6/2009 | Kim | |

(56) References Cited

U.S. PATENT DOCUMENTS

| | | |
|---|---|---|
| 2009/0232361 A1 | 9/2009 | Miller |
| 2009/0245652 A1 | 10/2009 | Bastos dos Santos |
| 2009/0271029 A1 | 10/2009 | Doutre |
| 2009/0307005 A1 | 12/2009 | O'Martin |
| 2010/0027834 A1 | 2/2010 | Spitzig |
| 2010/0070527 A1 | 3/2010 | Chen |
| 2010/0104200 A1 | 4/2010 | Baras et al. |
| 2010/0163612 A1 | 7/2010 | Caillon |
| 2010/0166303 A1 | 7/2010 | Rahimi |
| 2010/0174406 A1 | 7/2010 | Miette |
| 2011/0026831 A1 | 2/2011 | Perronnin |
| 2011/0081043 A1 | 4/2011 | Sabol et al. |
| 2011/0091068 A1 | 4/2011 | Stuck |
| 2011/0161117 A1 | 6/2011 | Busque et al. |
| 2011/0188709 A1 | 8/2011 | Gupta |
| 2011/0194780 A1 | 8/2011 | Lie |
| 2011/0235920 A1 | 9/2011 | Iwamoto |
| 2012/0042171 A1 | 2/2012 | White |
| 2012/0130868 A1 | 5/2012 | Loken |
| 2012/0199651 A1 | 8/2012 | Glazer |
| 2012/0250945 A1 | 10/2012 | Peng |
| 2013/0277425 A1 | 10/2013 | Sharma |
| 2013/0284803 A1 | 10/2013 | Wood |
| 2014/0140570 A1* | 5/2014 | Ross ............ G06K 9/00577 382/100 |
| 2014/0140571 A1 | 5/2014 | Elmenhurst |
| 2014/0184843 A1 | 7/2014 | Campbell |
| 2014/0270341 A1 | 9/2014 | Elmenhurst |
| 2014/0314283 A1 | 10/2014 | Harding |
| 2015/0067346 A1 | 3/2015 | Ross |
| 2015/0078629 A1 | 3/2015 | Gottemukkula |
| 2015/0086068 A1 | 3/2015 | Mulhearn |
| 2015/0117701 A1 | 4/2015 | Ross |
| 2015/0294189 A1 | 10/2015 | Benhimane et al. |
| 2015/0309502 A1 | 10/2015 | Breitgand et al. |
| 2016/0034914 A1 | 2/2016 | Gonen et al. |
| 2016/0117631 A1 | 4/2016 | McCloskey |
| 2016/0162734 A1 | 6/2016 | Ross |
| 2017/0243230 A1 | 8/2017 | Ross |
| 2017/0243231 A1 | 8/2017 | Ross |
| 2017/0243232 A1 | 8/2017 | Ross |
| 2017/0243233 A1* | 8/2017 | Land ............ G06Q 30/0185 |
| 2017/0300905 A1 | 10/2017 | Withrow et al. |
| 2017/0344823 A1 | 11/2017 | Withrow et al. |
| 2017/0372327 A1 | 12/2017 | Withrow |
| 2018/0012008 A1 | 1/2018 | Withrow et al. |

FOREIGN PATENT DOCUMENTS

| | | |
|---|---|---|
| EP | 759596 A2 | 2/1997 |
| EP | 1016548 A2 | 7/2000 |
| EP | 1719070 | 4/2006 |
| EP | 2195621 B1 | 6/2010 |
| EP | 2866193 A1 | 4/2015 |
| EP | 2 257 909 B1 | 5/2015 |
| EP | 2869240 A2 | 5/2015 |
| EP | 2869241 A2 | 5/2015 |
| EP | 3249581 A1 * | 5/2016 ......... G06K 9/00463 |
| EP | 3 249 581 A1 | 11/2017 |
| GB | 2097979 A | 11/1982 |
| JP | 61-234481 A | 10/1986 |
| WO | 2005/086616 A2 | 9/2005 |
| WO | 2006/038114 A1 | 4/2006 |
| WO | 2007/031176 A1 | 3/2007 |
| WO | 2007/071788 A1 | 6/2007 |
| WO | 2007/090437 A1 | 8/2007 |
| WO | 2007/144598 A1 | 12/2007 |
| WO | 2009/030853 A1 | 3/2009 |
| WO | 2010/018464 A2 | 2/2010 |
| WO | 2012/145842 A1 | 11/2010 |
| WO | 2013/126221 A1 | 8/2013 |
| WO | 2015/004434 A1 | 1/2015 |

OTHER PUBLICATIONS

Schneider et al., "A robust content based digital signature for image authentication", 1996, Retrieved from Internet on Feb. 18, 2018, retreived from URL:<http://ieeexplore.ieee.org/stamp/stamp.jsp?arnumber=560425>.*

D.G. Li, "http://ieeexplore.ieee.org/stamp/stamp.jsp?arnumber=1255386", 2003, Information Visualization and Soji Computing Research Laboratory School of Computer and Information Science, Retrieved from Internet on Feb. 19, 2018. Retrieved from URL:<http://ieeexplore.ieee.org/stamp/stamp.jsp?arnumber=1255386>.*

Clifton Smith; "Fireball: A Forensic Ballistic Imaging System"; Security Science, Edith Cowan University; IEEE; 1997.

Huang, et al., "An Online Ballistics Imaging System for Firearm Identification"; 2010 2nd International Conference on Signal Processing Systems (ICSPS).

Leng, et al., "A Novel Binarization Algorithms for Ballistics Imaging Systems"; 2010 3rd International Congress on Image and Signal Processing (CISP2010).

Li; "Firearm Identification System Based on Ballistics Image Processing"; 2008 Congress on Image and Signal Processing.

NCOA Link at http://ribbs.usps.gov/ncoalink/ncoalink_print.htm; dated May 27, 2009; 3 pages.

Online NCOALink Processing Acknowledgement Form (PAF) Released by Lorton Data; http://us.generation-nt.com/online-ncoalink-processing-acknowledgement-form-paf-released-by-press-1567191.html; release dated Jun. 2, 2009; 1 page.

Schwabe Williamson & Wyatt, PC, "Listing of Related Cases", Jul. 12, 2016; 2 pages.

United States Postal Service Publication 28 "Postal Addressing Standards", dated Jul. 2008; text plus Appendix A only; 55 pages.

United States Postal Service, "NCOALink Systems", http://www.usps.com/ncsc/addressservices/moveupdate/changeaddress.htm, website accessed Jun. 23, 2010, 2 pages.

European Search Report for Application No. 17181742.2 dated Aug. 24, 2017; 8 pages.

Farid, "Digital Image Forensics", Dartmouth CS 89/189, Sprint 2013; 199 pages.

Bao et al., "Local Feature based Multiple Object Instance Identification using Scale and Rotation Invariant Implicit Shape Model," *12th Asian Conference on Computer Vision*, Singapore, Singapore, Nov. 1-5, 2014, pp. 600-614.

Beekhof et al., "Secure Surface Identification Codes," *Proceedings of the SPIE 6819: Security, Forensics, Steganography, and Watermarking of Multimedia Contents* X:68190D, 2008. (12 pages).

Buchanan et al., "'Fingerprinting' documents and packaging," *Nature* 436(7050):475, 2005.

Di Paola et al., "An Autonomous Mobile Robotic System for Surveillance of Indoor Environments," *International Journal of Advanced Robotic Systems* 7(1):19-26, 2010.

Fischler et al., "Random Sample Consensus: A Paradigm for Model Fitting with Applications to Image Analysis and Automated Cartography," *Communications of the ACM* 24(6): 381 -395, 1981.

Kartik et al., "Security System with Face Recognition, SMS Alert and Embedded Network Video Monitoring Terminal," *International Journal of Security, Privacy and Trust Management* 2(5):9-19, 2013.

Matsumoto et al., "Nano-artifact metrics based on random collapse of resist," *Scientific Reports* 4:6142, 2014. (5 pages).

Rublee et al., "ORB: an efficient alternative to SIFT or SURF," *IEEE International Conference on Computer Vision*, Barcelona, Spain, Nov. 6-13, 2011, 8 pages.

Takahashi et al., "Mass-produced Parts Traceability System Based on Automated Scanning of *"Fingerprint of Things"*," *15th IAPR International Conference on Machine Vision Applications*, Nagoya, Japan, May 8-12, 2017, 5 pages.

Veena et al., "Automatic Theft Security System (Smart Surveillance Camera)," *Computer Science & Information Technology* 3:75-87, 2013.

U.S. Appl. No. 15/862,556, filed Jan. 4, 2018, David Justin Ross et al.

U.S. Appl. No. 15/680,137, filed Aug. 17, 2017, David Justin Ross et al.

(56) References Cited

OTHER PUBLICATIONS

U.S. Appl. No. 15/672,182, filed Aug. 8, 2017, David Justin Ross et al.
U.S. Appl. No. 15/649,567, filed Jul. 13, 2017, David Justin Ross et al.
U.S. Appl. No. 15/641,157, filed Jul. 3, 2017, Justin Lynn Withrow et al.
U.S. Appl. No. 15/635,040, filed Jun. 27, 2017, Justin Lynn Withrow.
U.S. Appl. No. 15/600,566, filed May 19, 2017, Justin Lynn Withrow et al.
U.S. Appl. No. 15/490,774, filed Apr. 18, 2017, Justin Lynn Withrow et al.
U.S. Appl. No. 15/436,656, filed Feb. 17, 2017, Scot E. Land et al.
U.S. Appl. No. 15/436,646, filed Feb. 17, 2017, David Justin Ross et al.
U.S. Appl. No. 15/436,631, filed Feb. 17, 2017, Justin Lynn Withrow et al.
U.S. Appl. No. 15/436,616, filed Feb. 17, 2017, David Justin Ross et al.
U.S. Appl. No. 15/208,339, filed Jul. 12, 2016, David Justin Ross et al.
U.S. Appl. No. 15/044,034, filed Feb. 15, 2016, David Ross et al.
U.S. Appl. No. 14/841,359, filed Aug. 31, 2015, David Justin Ross et al.
U.S. Appl. No. 14/531,724, filed Nov. 3, 2014, David Ross et al.
U.S. Appl. No. 14/531,307, filed Nov. 3, 2014, David Ross et al.
U.S. Appl. No. 14/290,653, filed May 29, 2014, Brian J. Elmenhurst et al.
U.S. Appl. No. 13/618,362, filed Sep. 14, 2012, David Justin Ross et al.
U.S. Appl. No. 13/410,753, filed Mar. 2, 2012, Brian J. Elmenhurst et al.
Li, "Image processing for the positive identification of forensic ballistics specimens," *Proceedings of the 6th International Conference of Information Fusion*, Cairns, Australia, Jul. 8-11, 2003, pp. 1494-1498.

\* cited by examiner

FORGERIES AND ALTERATIONS

FIG. 10

| Step 1 | | | | | | | | | | | | |
|---|---|---|---|---|---|---|---|---|---|---|---|---|
| 0 | 0 | 0 | 0 | 0 | 0 | | | | | | pixel location (x,y) | |
| 0 | 1 | 1 | 1 | 1 | 0 | | 1 | 1 | 1 | 1 | pixel value (0 or 1) | |
| 0 | 1 | 0 | 0 | 1 | 0 | Extract | 1 | | | 1 | Store as | |
| 0 | 1 | 0 | 0 | 1 | 0 | Features | 1 | | | 1 | Feature | [(1,1,1), (1,2,1), (1,3,1)...] |
| 0 | 1 | 1 | 1 | 1 | 0 | | 1 | 1 | 1 | 1 | Vector | |
| 0 | 0 | 0 | 0 | 0 | 0 | | | | | | | |
| Original Image | | | | | | | Extracted Features | | | | | |

FIG. 11

| Step 2 | | | | | | | | | | | | |
|---|---|---|---|---|---|---|---|---|---|---|---|---|
| 0 | 0 | 0 | 0 | 0 | 0 | | | | | | pixel location (x,y) | |
| 0 | 1 | 1 | 1 | 1 | 0 | | 1 | 1 | 1 | 1 | pixel value (0 or 1) | |
| 0 | 1 | 0 | 0 | 1 | 0 | Extract | 1 | | | 1 | Store as | |
| 0 | 1 | 0 | 0 | 1 | 0 | Features | 1 | | | 1 | Feature | [(1,1,1), (1,2,1), (1,3,1)...] |
| 0 | 1 | 1 | 1 | 1 | 0 | | 1 | 1 | 1 | 1 | Vector | |
| 0 | 0 | 0 | 0 | 0 | 0 | | | | | | | |
| Comparison Image | | | | | | | Extracted Features | | | | | |

FIG. 12

| Step 3 | | | | |
|---|---|---|---|---|
| | | Compare | | |
| [(1,1,1), (1,2,1), (1,3,1)...] | | Feature Vectors | [(1,1,1), (1,2,1), (1,3,1)...] | = Objects Match |
| Original Features | | | Comparison Features | |

FIG. 14A
FIG. 14B
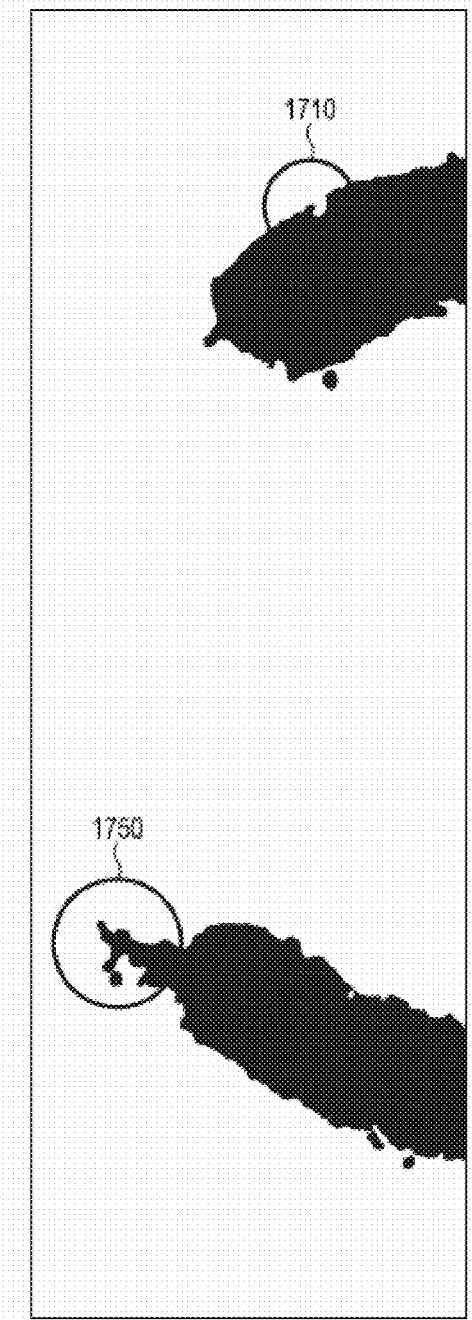
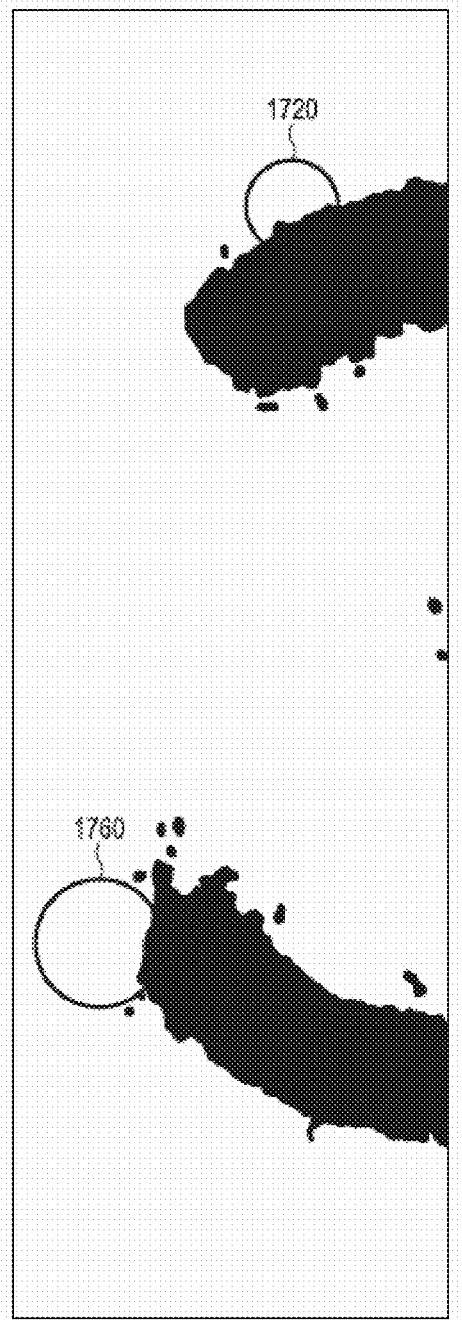

FIG. 16A
FIG. 16B
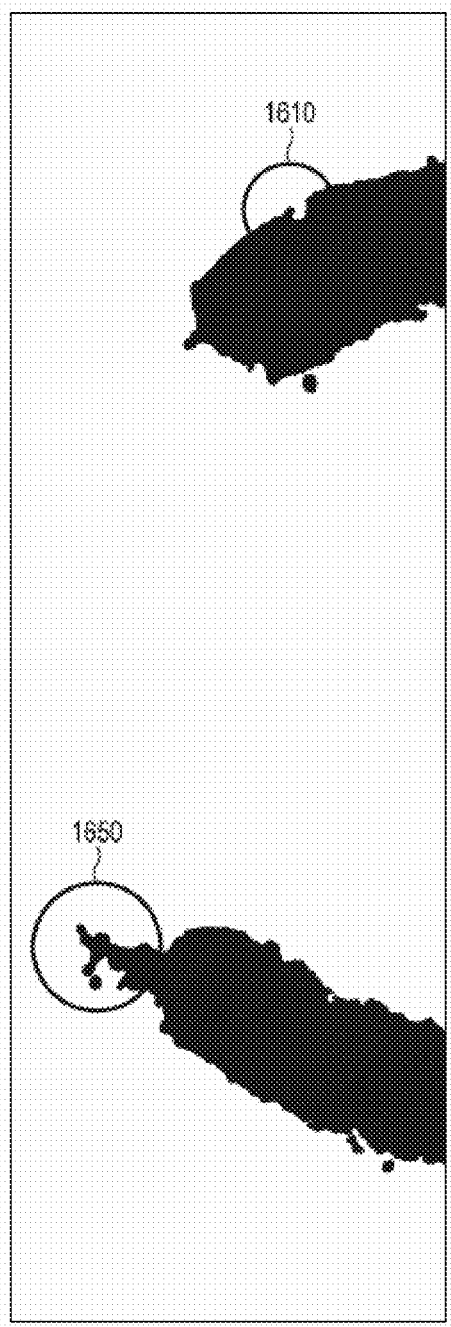
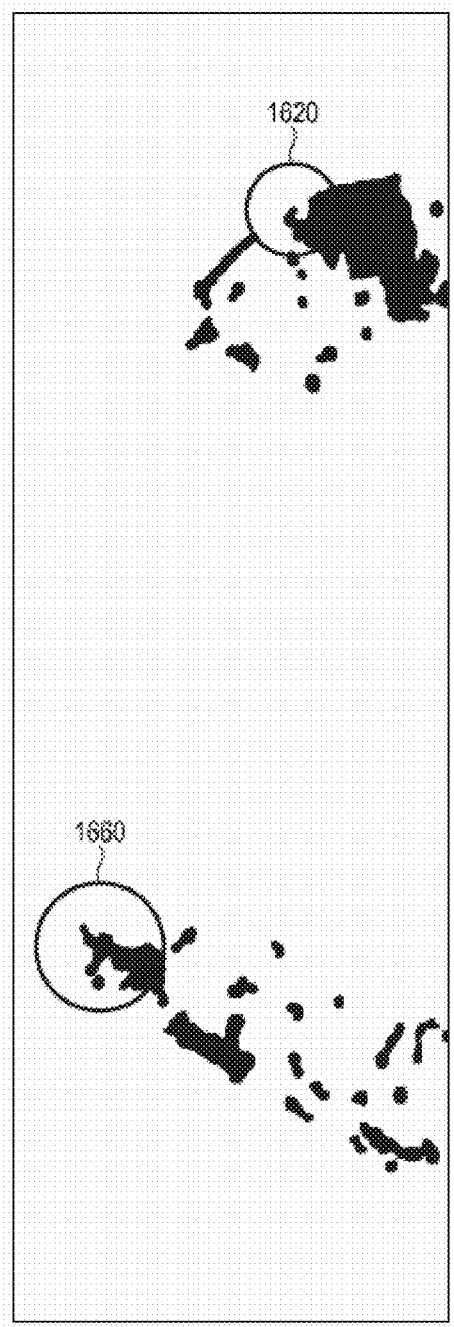

DATABASE FOR DETECTING COUNTERFEIT ITEMS USING DIGITAL FINGERPRINT RECORDS

RELATED APPLICATIONS

This application is a divisional of U.S. application Ser. No. 14/531,724, filed Nov. 3, 2014, which is a non-provisional, pursuant to 35 U.S.C. § 119(e), of U.S. provisional application No. 61/914,722 filed Dec. 11, 2013 and U.S. provisional application No. 61/898,780 filed Nov. 1, 2013, both incorporated herein by this reference. This application also is a continuation-in-part of U.S. application Ser. No. 14/290,653 filed May 29, 2014 (now U.S. Pat. No. 9,350,552), which is a continuation of U.S. application Ser. No. 13/410,753 filed Mar. 2, 2012 (now U.S. Pat. No. 8,774,455), both incorporated herein by this reference.

COPYRIGHT NOTICE

© 2011-2016 Authentect, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This invention pertains to methods and apparatus to identify and/or authenticate physical items, including documents, and more specifically to using a secure database of digital fingerprint records to detect a counterfeit item.

BACKGROUND OF THE INVENTION

Counterfeiting of manufactured goods is a worldwide problem, with recent studies estimating that 8% of the world's total GDP is now generated by the manufacturing and sales of counterfeit products. Many classes of counterfeit goods create substantial risks to public health including counterfeit pharmaceutical drugs, auto parts, pesticides, and children's toys. In addition, counterfeit computer chips, aerospace parts, and identification documents present significant risks to national security.

Many different approaches have been tried to uniquely identify and authenticate objects, including serial numbers, bar codes, holographic labels, RFID tags, and hidden patterns using security inks or special fibers. All of these methods can be duplicated, and many add a substantial extra cost to the production of the goods being protected. In addition, physically marking certain objects such as artwork, gemstones, and collector-grade coins can damage or destroy the value of the object.

If identifying or certifying information is stored separately from the object in the form of a label, tag, or certificate the entire identification/certification process must typically be performed again if the object is lost and later recovered, or its chain of control is otherwise compromised. There is a need for solutions that can prove the provenance of an object once the chain of custody is disrupted by the removal of the object from safe custody and/or the loss of the associated identification or certification information.

Other known techniques call for comparing bitmaps of images of the objects themselves, or selected regions of interest. Referring now to FIG. 8, the image of the original object is taken and stored for reference. The whole image is stored, although it may be compressed for efficiency. When a new object is encountered, an image is taken of the new object and directly compared to the original image using XOR or similar algorithms. If there are no (or only statistically insignificant) differences, the images are declared a match and the object is authenticated. Further, FFT or similar transforms may be used to generate a "digital signature" of the image that can be used for comparison. See FIG. 9. However, as in the previous case the same method is used—the resultant bitmapped image is compared with another bitmapped image, and if the pixels match the object is authenticated. Such methods are disclosed in U.S. Pat. No. 7,680,306 to Boutant et al. Bitmapped techniques are inefficient due to issues like file size, and have serious limitations that make them effectively unusable in most real world applications, due to variable lighting and orientation of the images, and the authentication of worn, damaged or otherwise altered objects.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

A physical object is scanned and a digital image of the object is created from the scan. A subset of the image known as an "authentication region" is selected. A set of features is extracted from the authentication region, which is sufficient to create a unique identifier or "digital fingerprint" for that object. The digital fingerprint may be registered in a database.

To select locations in an image to extract fingerprint features, a software process automatically selects a large number—typically hundreds or even thousands per square mm—of preferred areas of interest for purposes of digital fingerprint. A location may be of interest because of a relatively high level of content. That "content" in a preferred embodiment may comprise a gradient or vector, including a change in value and a direction.

In a preferred embodiment, each such area of interest is identified as a circle, for example, by centroid location and radius. Within each circular area of interest, the software then extracts one or more fingerprint features that define the relevant shapes within the corresponding circular location of the image. Each fingerprint feature preferably is stored as a feature vector as illustrated below. A feature vector preferably is an array of integer or floating point values describing an individual shape.

When an object is to be authenticated, a suitable system compares the digital fingerprint of the object to digital fingerprints previously stored in the database, and based on that comparison determines whether the object has been registered before, and is thus authentic. The digital fingerprint data specifies a set of features. Preferably, an "object feature template" may be created which has a list of specific features and attributes that are relevant for authenticating a particular class of objects. A template may identify locations of particular features. One of the key advantages of the feature based method is that when the object is very worn from handling or use, the system can still identify the object as original, may be impossible with the bitmapped approach.

Another aspect of this disclosure relates to detecting a counterfeit or forged object, for example a document such as a drivers license or passport. In this case, there may be no "original" or source object digital fingerprint for comparison. Rather, "fingerprints" of known indicia of counterfeit or forged objects can be acquired and stored. For example, a large number of counterfeit New York State driver's licenses might be obtained by law enforcement officials in a raid or the like. Digital images of those forged documents can be acquired, and analyzed to form digital fingerprints, as described in more detail below. "Forgery feature vectors" of typical features that occur in the counterfeit licenses can be collected and stored in a database. Such indicia may include, for example, sharp, non-bleeding edges where a photograph has been replaced or torn paper fibers where an erasure occurred. These stored features from the counterfeit licenses can then be analyzed and stored as a reference set of fraudulent methods which can then be compared to new license fingerprints to detect a forged document. A count of "fraud indicator matches" can be compared to an empirical threshold to determine and quantify a confidence that a document is forged (or not).

Further, the fingerprinting approach described below can be used to determine whether a manufactured object meets its manufactured specifications. Applications of the system include but are not limited to object authentication, anti-counterfeiting, determining the provenance of an object, and compliance with manufacturing specifications.

Additional aspects and advantages of this invention will be apparent from the following detailed description of preferred embodiments, which proceeds with reference to the accompanying drawings.

BRIEF DESCRIPTION OF THE DRAWINGS

FIG. 10 is a simple illustration of fingerprint feature extraction from an original digital image.

FIG. 11 is a simple illustration of fingerprint feature extraction from a comparison or candidate image.

FIG. 12 is a simple illustration of fingerprint feature comparison for identifying or authenticating an object.

FIG. 14A is an illustration of results of feature extraction showing selected areas of interest in the image of FIG. 13A.

FIG. 14B is an illustration of results of feature extraction showing selected areas of interest in the image of FIG. 13B.

FIG. 16A shows detail of two fingerprint feature locations on the numeral 3.

FIG. 16B shows detail of the damaged bill with the corresponding fingerprint feature locations called out for comparison.

DETAILED DESCRIPTION OF PREFERRED EMBODIMENTS

Figure 1:
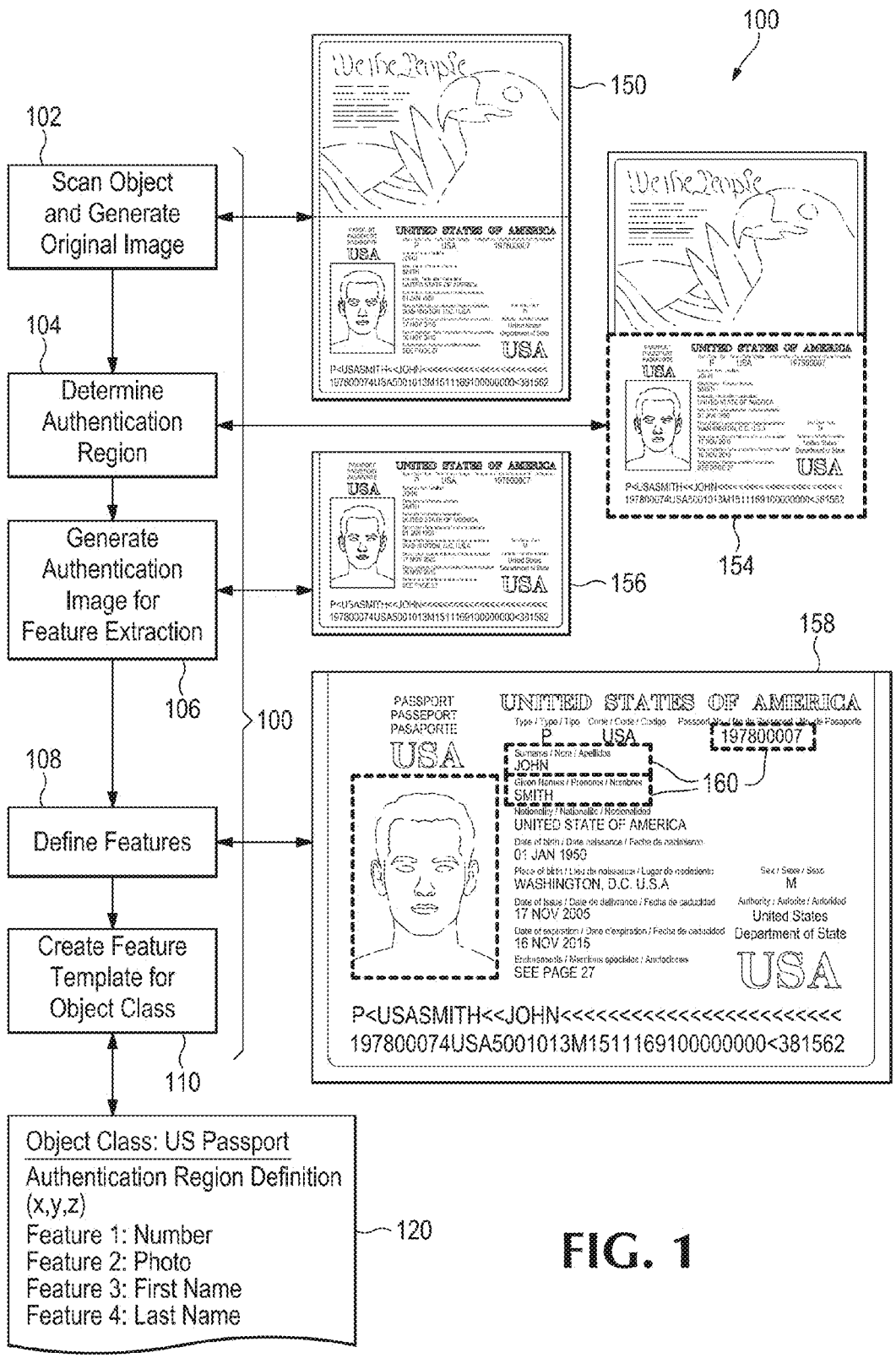
FIG. 1 is an example of an authentication region and object feature template definition for a U.S. passport.

The methods described in this disclosure enable the identification of objects without attaching or associating any physical tags or materials with the object. A system does this by creating a unique digital signature for the object, which is referred to as a digital fingerprint. Digital fingerprinting utilizes the natural structure of the object, or essentially random features created incidental to the manufacturing process, to generate a unique digital signature for that object, much like a human fingerprint. Also like a human fingerprint, the digital fingerprint can be stored and retrieved to identify objects when they are encountered at a later date.

Eliminating the need to add tags or any physical modifications to the object offers a number of advantages to manufacturers, distributors, sellers and owners of goods. It reduces the cost of manufacturing, and is more secure than physical tagging. Physical tags may be lost, modified, stolen, duplicated, or counterfeited; digital fingerprints cannot.

Unlike prior art approaches that simply utilize a comparison of pixels, a system in accordance with this disclosure utilizes the extraction of features to identify and authenticate objects. Feature extraction enables us to take a large amount of information and reduce it to a smaller set of data points that can be processed more efficiently. For example, a large digital image that contains tens of thousands of pixels may be reduced to just a few features that can effectively identify the object. This reduced set of data we call a digital fingerprint. This digital fingerprint contains a set of individual fingerprint features which are stored as feature vectors. These vectors make image processing more efficient and reduce storage requirements, as the entire image need not be stored in the database, only the feature vectors. Examples of feature extraction algorithms include but are not limited to edge detection, corner detection, blob detection, wavelet features; Gabor, gradient and steerable output filter histograms, scale-invariant feature transformation, active contours, shape contexts and parameterized shapes.

While the most common applications of our system may be in the authentication of manufactured goods and documents, the system is designed to be applicable to any object that can be identified, characterized, quality tested, or authenticated with a digital fingerprint. These include but are not limited to mail pieces, parcels, art, coins, currency, precious metals, gems, jewelry, apparel, mechanical parts, consumer goods, integrated circuits, firearms, pharmaceuticals and food and beverages. Here we use the term "system" in a broad sense, including our methods as well as apparatus arranged to implement such methods.

Scanning

In an embodiment, an object is scanned and identified either at initial manufacture or at the time of first contact with the system. This point of identification is preferably done when the item is either in the possession of its manufacturer, or has been transferred by secure means to the current holder so that its legitimacy at point of identification is adequately established. When such a process is impossible, as in the example of artworks or old coins, the object may be fingerprinted after the object is authenticated by an expert while its provenance is still secure.

In this application, we use the term "scan" in a broad sense. We refer to any means for capturing an image or set of images, which may be in digital form or transformed into digital form. The images may be two dimensional, three dimensional, or be in the form of a video. Thus a "scan" may refer to an image (or digital data that defines an image) captured by a scanner, a camera, a specially-adapted sensor array such as CCD array, a microscope, a smart phone camera, a video camera, an x-ray machine, etc. Broadly, any device that can sense and capture electromagnetic radiation that has traveled through an object, or reflected off of an object, is a candidate to create a "scan" of the object. Other means to extract "fingerprints" or features from an object may be used; for example, through sound, physical structure, chemical composition, or many others. The remainder of this application will use terms like "image" but when doing so, the broader uses of this technology should be implied. In other words, alternative means to extract "fingerprints" or features from an object should be considered equivalents within the scope of this disclosure.

Authentication Regions

Because the system works with many different types of objects, it is necessary to define what parts of the digital images of the objects are to be used for the extraction of features for authentication purposes. This can vary widely for different classes of objects. In some cases it is the image of the entire object; in other cases it will be a specific sub-region of the image of the object.

For instance, for a photograph we may want to use the digital image of the entire photograph for feature extraction. Each photograph is different, and there may be unique feature information anywhere in the photograph. So in this case, the authentication region will be the entire photograph.

Multiple regions may be used for fingerprints for several reasons, two of which are particularly important. It may be that there are several regions where significant variations take place among different similar objects that need to be distinguished while, in the same objects, there may be regions of little significance, i.e., in which there is little or no variation among different objects. In that case, the authentication region is used primarily to eliminate regions of little interest.

A bank note, for example, has a sufficient number of unique features that it can be authenticated if a few small arbitrary regions scattered across the surface are fingerprinted, along with recognizing the contents of a region telling the value of the bank note and one containing the bank note's serial number. In such a case the fingerprints of any region (along with sufficient additional information to determine the bank note's value and its purported identity) may be sufficient to establish the authenticity of the bill and multiple fingerprinted regions are used solely in the event that one or more regions may be absent (through, for example, tearing) when the bill is later presented for authentication.

Sometimes, however, specific regions of an item must be authenticated to ensure the item is both authentic and has not been altered. A passport provides an example. On a passport the features preferably used for authentication are extracted from regions containing such specific identification information as the passport number, recipient name, and recipient photo. In that case, we define a template of all those regions whose alteration from the original would invalidate the passport, such regions including the passport holder's photo and unique personal data.

FIG. 1 illustrates an example of an authentication region and object feature template definition for a U.S. passport. In this figure, brace 100 refers to a simplified flow diagram of a process as follows. At process block 102, an object is scanned to generate an original "image"—technically a digital data file in any suitable format. We will simply refer to this data as an image. The original image is illustrated as the front page of a U.S. passport 150. Next, the system processes the image data to determine an authentication region. For example, here the authentication region is the lower portion of image 150, identified by dashed box 154. Next the process generates an authentication image for feature extraction, block 106. The image is illustrated at reference 156. Next, at block 108, the process defines one or more features for extraction. These are shown in the image 158 by dashed boxes 160, for example, surname, given name, and passport number regions.

Finally, at block 110, the process 100 comprises creating a feature template 120. In this example, template 120 identifies an object class (U.S. Passport), defines an authentication regions (for example, by X-Y coordinates), and it lists one or more features within that authentication region. Here, the list comprises passport number, photo, first name and last name.

The ability to define and store the optimal authentication region for a given class of objects offers significant benefits to the user. In many cases it is much easier to scan a limited region of an object than the entire object. For instance, in the case of an article of designer clothing, it is much easier to take a picture of the manufacturer's label than it is to take a picture of the entire garment. Further, defining such regions enable the detection of partial alteration of the object.

Once an authentication region is defined, specific applications can be created for different markets and classes of objects that can assist the user in locating and scanning the optimal authentication region. For instance, an appropriately sized location box and crosshairs can automatically appear in the viewfinder of a smartphone camera application to help the user center the camera on the authentication region, and automatically lock onto the region and take the picture when the camera is focused on the correct area.

In many cases, objects may have permanent labels or other identifying information attached to them. These can also be used as features. For instance, wine may be put into a glass bottle and a label affixed to the bottle. Since it is possible for a label to be removed and reused, simply using the label itself as the authentication region is often not sufficient. In this case we may define the authentication region to include both the label and the substrate it is attached to—in this case some portion of the glass bottle. This "label and substrate" approach may be useful in defining authentication regions for many types of objects, such as consumer goods and pharmaceutical packaging. If a label has been moved from it's original position, this can be an indication of tampering or counterfeiting. If the object has "tamper-proof" packaging, this may also be useful to include in the authentication region.

In some cases, we will want to use multiple authentication regions to extract unique features. For a firearm, for example, we might extract features from two different parts of the weapon. It is, of course, important that both match the original, but since the two parts may both have been taken from the original weapon and affixed to a weapon of substandard quality, it may also be important to determine whether their relative positions have changed as well. In other words it may be necessary to determine that the distance (or other characteristic) between Part A's authentication region and Part B's authentication region is effectively unchanged, and only if that is accomplished can the weapon be authenticated.

Object Feature Template Definition

When a new type or class of object is being scanned into the system for the first time, the system can create an Object Feature Template (as shown in FIG. 1) that can be used to optimize subsequent authentication operations for that class of objects. This template can either be created automatically by the system, or by using a human-assisted process.

An Object Feature Template is not required for the system to authenticate an object, as the system can automatically extract features and create a digital fingerprint of an object without it. However, the presence of a template can greatly optimize the authentication process and add additional functionality to the system.

TABLE 1

Example Object Feature Template.

CLASS:
[Description of the object]
United States Passport
AUTHENTICATION REGION:
[Description of the authentication regions for the object]
Region 1: (x1, y1, z1), (x2, y2, z2)
.
.
Region n
REGION MATCH LIST
[List of the regions that are required to match to identify an object]
Region List: 1..n
FEATURES:
[Key features of the object]
   Feature 1: Passport Number
Feature 2: Photo
Feature 3: First Name
Feature 4: Last Name
.
.
Feature n
METHODS:
[Programs that can be run on features of an object]
Feature 2:
   Photo Method 1: [checkphoto.exe] Check for uneven edges indicating photo substitution
   .
   .
   Method n
Feature n
   Method n
ADDITIONAL DATA
[Additional data associated with the object]
Data 1: example data
.
.
Data n The uses of the Object Feature Template include but are not limited to determining the regions of interest on the object, the methods of extracting fingerprinting and other information from those regions of interest, and methods for comparing such features at different points in time. The name "object feature template" is not important; other data with similar functionality (but a different moniker) should be considered equivalent.

Four different but related uses for this technology are particularly in view in this disclosure. These are illustrative but are not intended to be limiting of the scope of the disclosure. These applications may be classified broadly as (1) authentication of a previously scanned original, (2) detection of alteration of a previously scanned original, (3) detection of a counterfeit object without benefit of an original, and (4) determination whether a manufactured item is within manufacturing or other applicable specification.

In case (1), the object is fingerprinted during the creation process (or while its provenance is unquestioned), or at the point where an expert has determined its authenticity and then the object is later re-fingerprinted, and the two sets of fingerprints are compared to establish authenticity of the object. This may be done by extracting a single fingerprint from the entire object or by extracting multiple sets of features from different authentication regions. It may also be facilitated by reading or otherwise detecting a serial number or other identifying characteristic of the object using optical character recognition or other means to make determining which original to compare it with easier. In many cases, manufacturing databases use serial numbers as identifiers. If we know the serial number we can directly access the database record for the object, and can directly compare the digital fingerprint to the original that was stored during the creation process, rather than searching the entire digital fingerprinting database for a match.

In case (2), the object is compared region by region with the original looking for low or nonexistent match of the fingerprint features from those regions. While case (1) is designed to determine whether the original object is now present, this case (2) is to determine whether the original object has been modified and if so, detecting how. In some embodiments, regions of interest having poor or no matching fingerprint features are presumed to have been altered.

In case (3), the item may not have been fingerprinted while its provenance was secure. An example would be legacy bills or passports created prior to initiating the use of a digital fingerprinting system during the creation process. In this case, the fingerprints of regions of interest may be compared with fingerprints from examples of known counterfeit objects, or with both those and fingerprints of known good objects. As an example, if a photo is added to a passport, the edge of the photo is liable to be sharper than the edge of the original, unaltered photo, indicating a cut and paste operation. Fingerprint characteristics of known good passports and those of passports known to have been altered by changing the photograph can be compared with the passport being inspected to determine whether it shows features of alteration.

Figure 6:
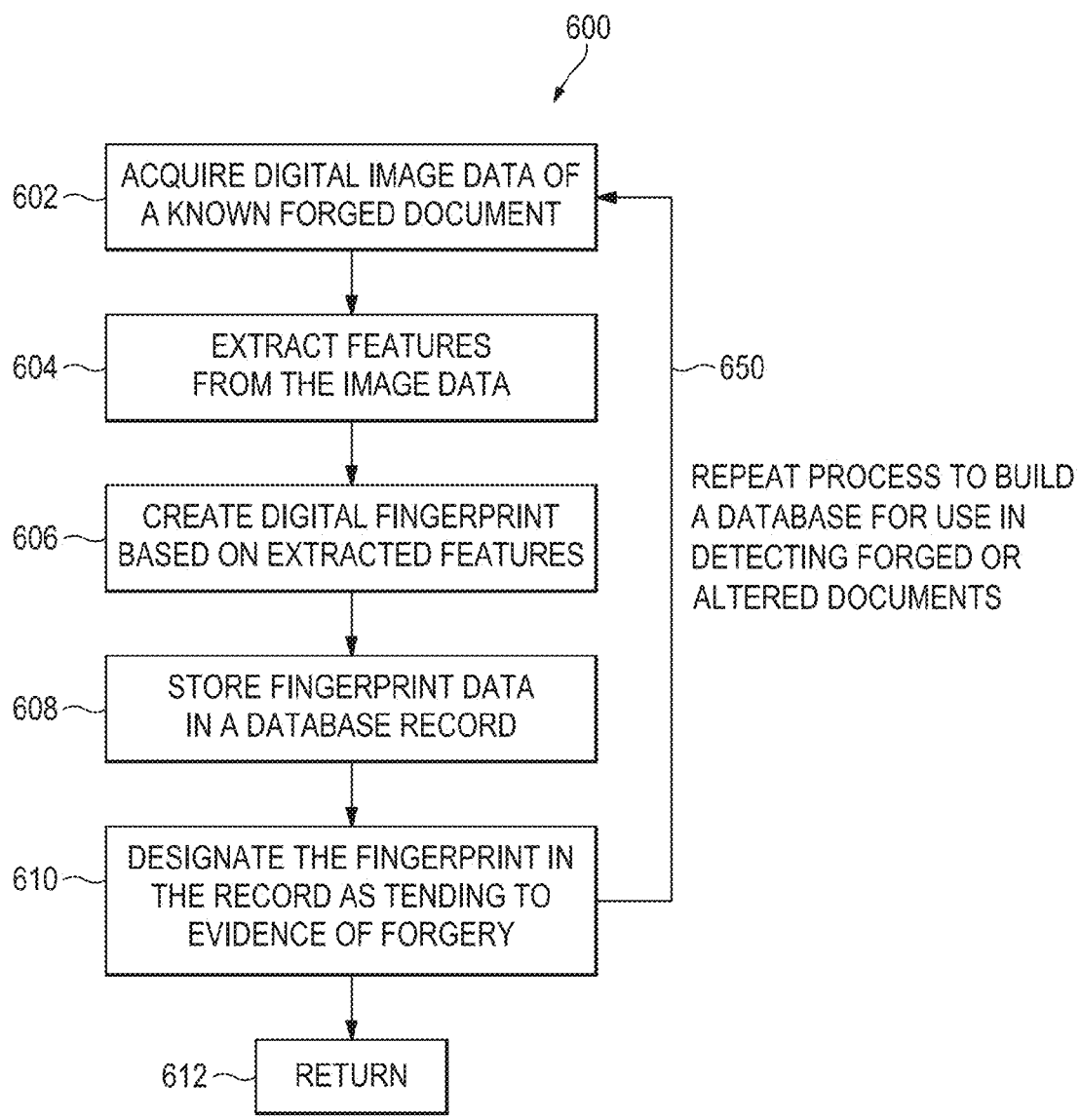
FIG. 6 is a simplified flow diagram illustrating a method for building a database for use in detecting forged or altered documents.

FIG. 6 is a simplified flow diagram of a process 600 for building a database for use in detecting counterfeit (forged or altered) objects. At process block 602, digital image data is acquired of a known forged or altered document. Next, we extract features from the image data, as discussed above, block 604. Continuing, at block 606 a digital fingerprint is created based on the extracted features.

The digital fingerprint data is stored in a database record, block 608. Further, the record (digital fingerprint) is designated in the database as having features tending to evidence a forgery, block 610. The basic process may be repeated, loop 650, to acquire more images, and more features, to build the database.

Returning to case (4), the question of authenticity or alteration is not at issue. Instead we use the fingerprinting process to determine whether an object was manufactured sufficiently close to the manufacturing specification. In this case comparison of fingerprint features is against the ideal features of a presumed-perfect object, referred to as the "reference object". The reference object may exist (e.g. be one or more examples of the object that has been inspected by hand and declared good enough to serve as a standard) or may be a programmatic ideal. In this latter case the "ideal" fingerprint features will be generated manually or by a program rather than scanned off an original.

The Object Feature Template can contain a variety of information related to that class of objects. For instance, it would typically include the authentication region(s) for that class of objects, which authentication regions are required to determine a match, and a list of key features that are typically used in authenticating that object.

Additionally, a template can define methods to be applied to features that can be used to examine an object for signs of unauthorized modification or counterfeiting. For instance, every time a passport is scanned into the system, a program can automatically be run to examine the passport photo for signs of alteration. If the passport was fingerprinted at creation, fingerprints extracted from each such region at creation will be compared to fingerprints from corresponding regions when the passport is presented for authentication. If the passport was not fingerprinted at creation, the region template can be used, for example, to look for sharp, non-bleeding edges that can indicate where a photograph has been replaced or torn paper fibers can indicate where an erasure occurred. In addition to the examples discussed above, the Object Feature Template is designed to be extensible, and can store any additional data that is related to the object.

Digital Fingerprint Generation

Once an object has been scanned and at least one authentication region has been identified, the final digital image that will be used to create the unique digital fingerprint for the object is created. This image (or set of images) will provide the source information for the feature extraction process.

A "digital fingerprinting feature" is a feature of the object that is innate to the object itself, a result of the manufacturing process, a result of external processes, or of any other random or pseudo random process. For example, gemstones have a crystal pattern which provides an identifying feature set. Every gemstone is unique and every gem stone has a series of random flaws in its crystal structure. This crystal pattern may be used to generate feature vectors for identification and authentication.

A "feature" in this description is typically not concerned with reading or recognizing meaningful content by using methods like OCR (optical character recognition). For example, a label on a scanned object with a printed serial number may give rise to various features in fingerprint processing, some of which may become part of a digital fingerprint feature set or vector that is associated with the object. The features may refer to light and dark areas, locations, spacing, ink blobs, etc. This information may refer to the printed serial number on the label, but in the normal course of feature extraction during the fingerprinting process there is no effort to actually "read" or recognize the printed serial number.

As part of identifying the object, however, for ease of comparison of fingerprint features with those of the original which are stored in the object database, such information may in fact be read and stored by utilizing such techniques as optical character recognition. In many cases, serial numbers may be used as the primary index into a manufacturer's database, which may also contain the digital fingerprints. It would be far faster, for example, to determine whether a bank note being inspected is a match with a particular original if we can use the serial number, say "A93188871A" as an index into the digital fingerprinting database, rather than trying to determine which one it matches by iterating through many thousands of fingerprints. In this case (and in similar cases of weapon and passport serial numbers), the index recognition speeds up the comparison process but is not essential to it.

Once a suitable digital fingerprint of an object is generated, it may be stored or "registered" in a database. For example, in some embodiments, the digital fingerprint may comprise one or more fingerprint features which are stored as feature vectors. The database should be secure. In some embodiments, a unique ID such as a serial number also may be assigned to an object. An ID may be a convenient index in some applications. However, it is not essential, as a digital fingerprint itself can serve as a key for searching a database. In other words, by identifying an object by the unique features and characteristics of the object itself, arbitrary identifiers, labels, tags, etc. are unnecessary.

Figure 2:
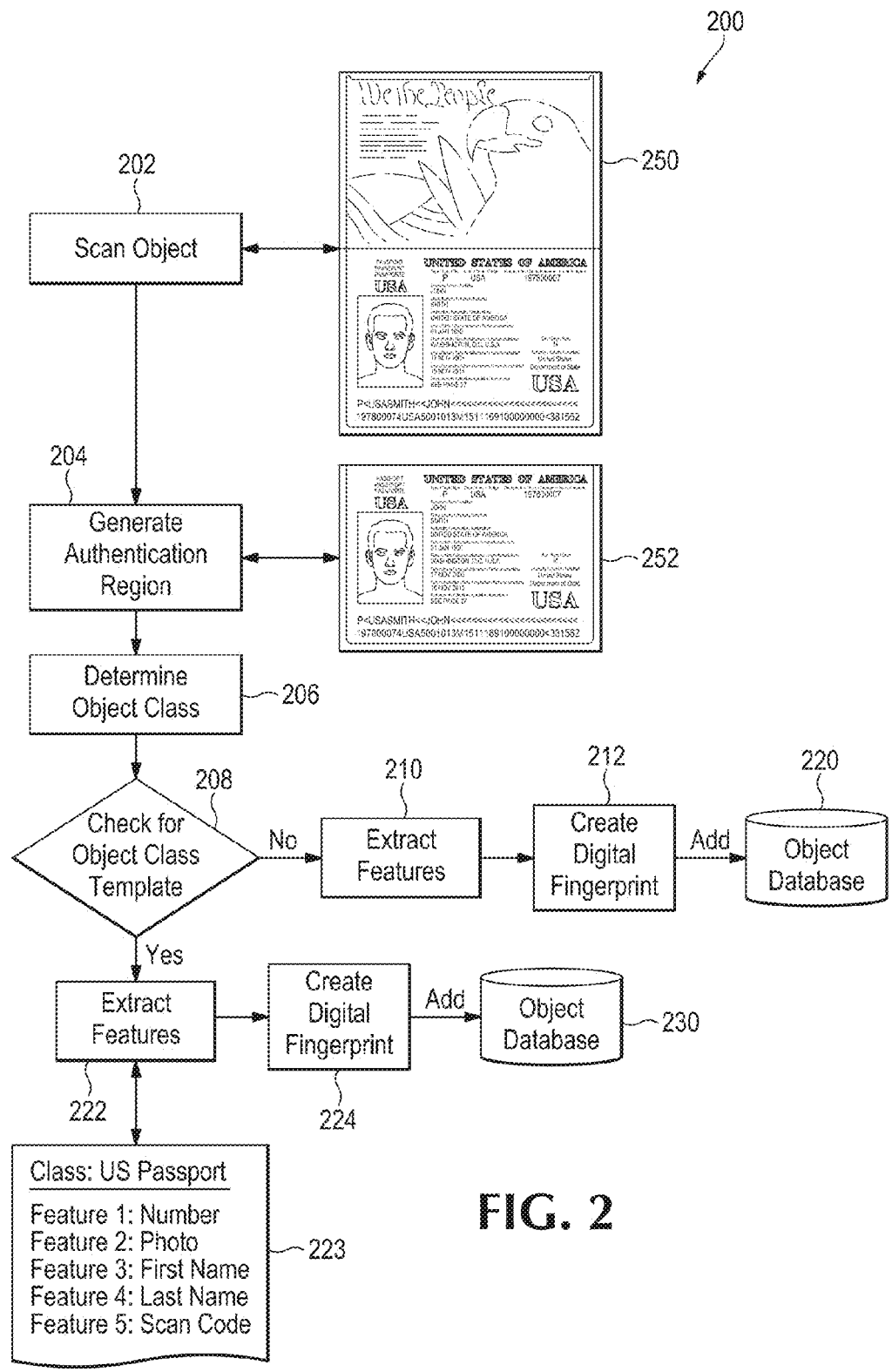
FIG. 2 is a simplified flow diagram of a process for digital fingerprint generation and registration.

FIG. 2 is a simplified flow diagram of a process 200 for digital fingerprint generation and registration. In this case, the process begins with scanning the object, block 202. An image 250 is acquired, in this illustration an U.S. passport is used. The next step is to identify or generate an authentication region, block 204. For example, the authentication region may be the portion 252. The authentication region may be identified, as discussed above, from an object feature template (see Table 1). Next an object class of the object is determined, block 206. The result is used to check a database for a corresponding object class template, decision 208. If there is no matching template, the process proceeds to extract features, block 210 without the aid of a template. A digital fingerprint is created based on the extracted feature, block 212, and that digital fingerprint is stored in an object database 220.

Alternatively, if a matching object class template is found at decision 208, the process continues to extract features, block 222, utilizing the class template 223 to identify and locate the features. Then, a digital fingerprint is created from the resulting feature data, block 224, and stored in a database 230.

Authentication and Inspection Processes

When an object is presented, it is scanned and an image is generated. At that point, the steps to be followed depend on the operation to be performed. Several illustrative cases are discussed below.

Case #1: For authentication of a previously fingerprinted object, the following steps may be followed (see FIG. 3, discussed below):

1. The authentication region (or regions) is either determined automatically by the system, or by utilizing the authentication region definitions stored in an Object Feature Template.

2. The relevant features are extracted from the authentication region(s) and the digital fingerprint is created. This will typically be in the form of feature vectors, but other data structures may be used as appropriate.
3. Optionally, a unique identifier such as a serial number may be extracted and stored to augment subsequent search and identification functions.
4. The digital fingerprint of the object to be authenticated is compared to the digital fingerprints stored in the database.
5. The system reports whether the object is authentic; i.e. whether it matches one of the digital fingerprints stored in the database.
6. The system may then store the digital fingerprint of the object to be authenticated in the database along with the results of the authentication process. Normally only the extracted features will be stored in the database, but the authentication image and/or the original image may be stored in the database for archival or audit purposes.

Figure 3:
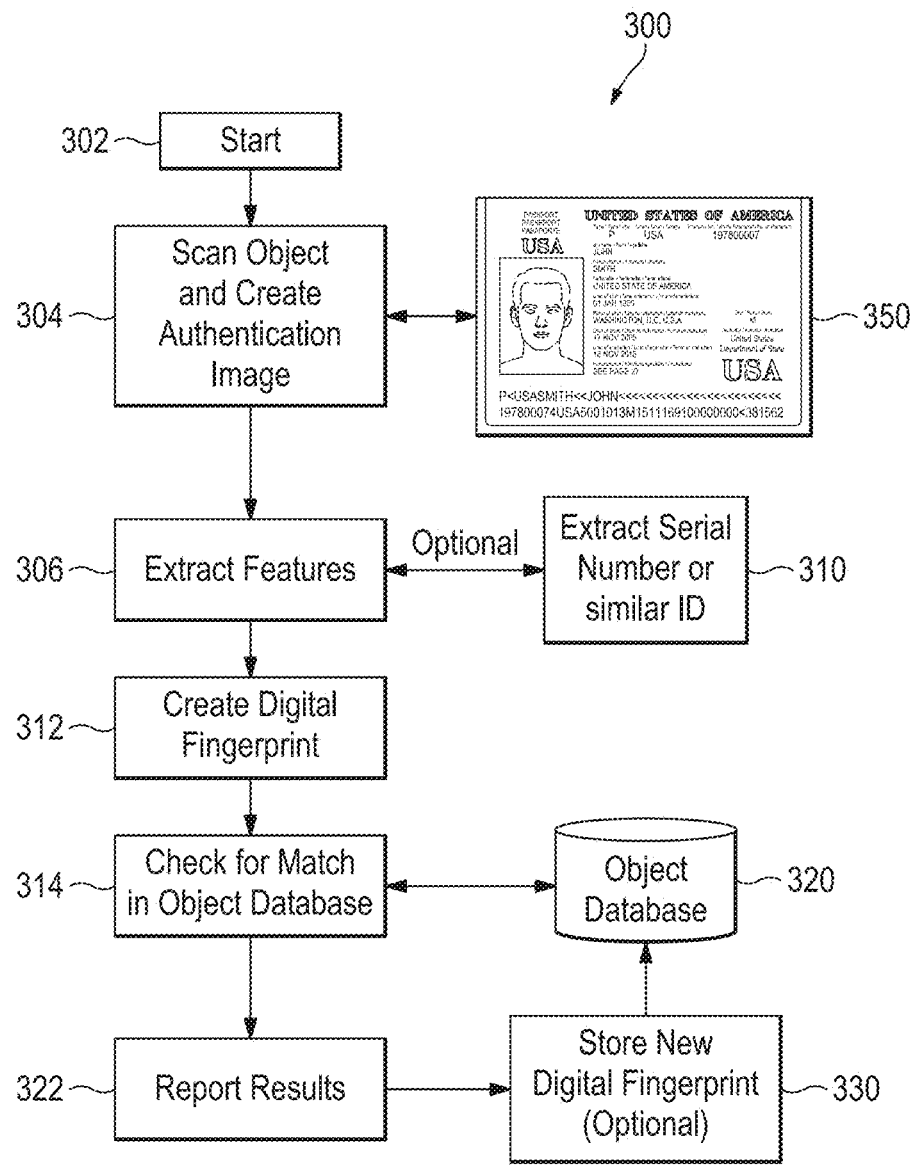
FIG. 3 is a simplified flow diagram of a process for authentication of a previously fingerprinted object.

FIG. 3 illustrates such a process 300 in diagrammatic form. Beginning at start block 302, the process scans an object and creates an authentication image, block 304. The image is represented at 350, again using the passport example. Features are extracted, block 306, and optionally a serial number or similar ID number, preferably unique, may be extracted as well, block 310.

The extracted data is processed to create a digital fingerprint, bloc 312. An object database 320 may be queried for a matching fingerprint, block 314. A "match" may be defined by a probability or similarity metric. Results of the database query may be reported to a user, block 322. Finally, a new digital fingerprint may be stored into the database 320, shown at process block 330.

Case #2: For inspection of specific features of a previously fingerprinted object to determine whether they have been altered, the steps are similar to Case #1, but the process is used for the detection of alterations rather than authentication of the object:
1. The authentication region (or regions) is either determined automatically by the system, or by utilizing the authentication region definitions stored in an Object Feature Template.
2. The features to be inspected are extracted from the authentication region and the digital fingerprint is created. This will typically be in the form of feature vectors for the features to be inspected but other data structures may be used as appropriate.
3. Optionally, a unique identifier such as a serial number may be extracted and stored to be used to augment subsequent search and identification functions.
4. The digital fingerprint of the features to be inspected for alteration is compared to the fingerprint of the corresponding features from the original object stored in the database.
5. The system reports whether the object has been altered; i.e. whether the digital fingerprint of the features to be inspected match those previously stored in the database from the original object.
6. The system may then store the digital fingerprint of the features to be inspected in the database along with the results of the inspection process. Normally only the features will be stored in the database, but the authentication image and/or the original image may be stored in the database for archival or audit purposes.

Figure 4:
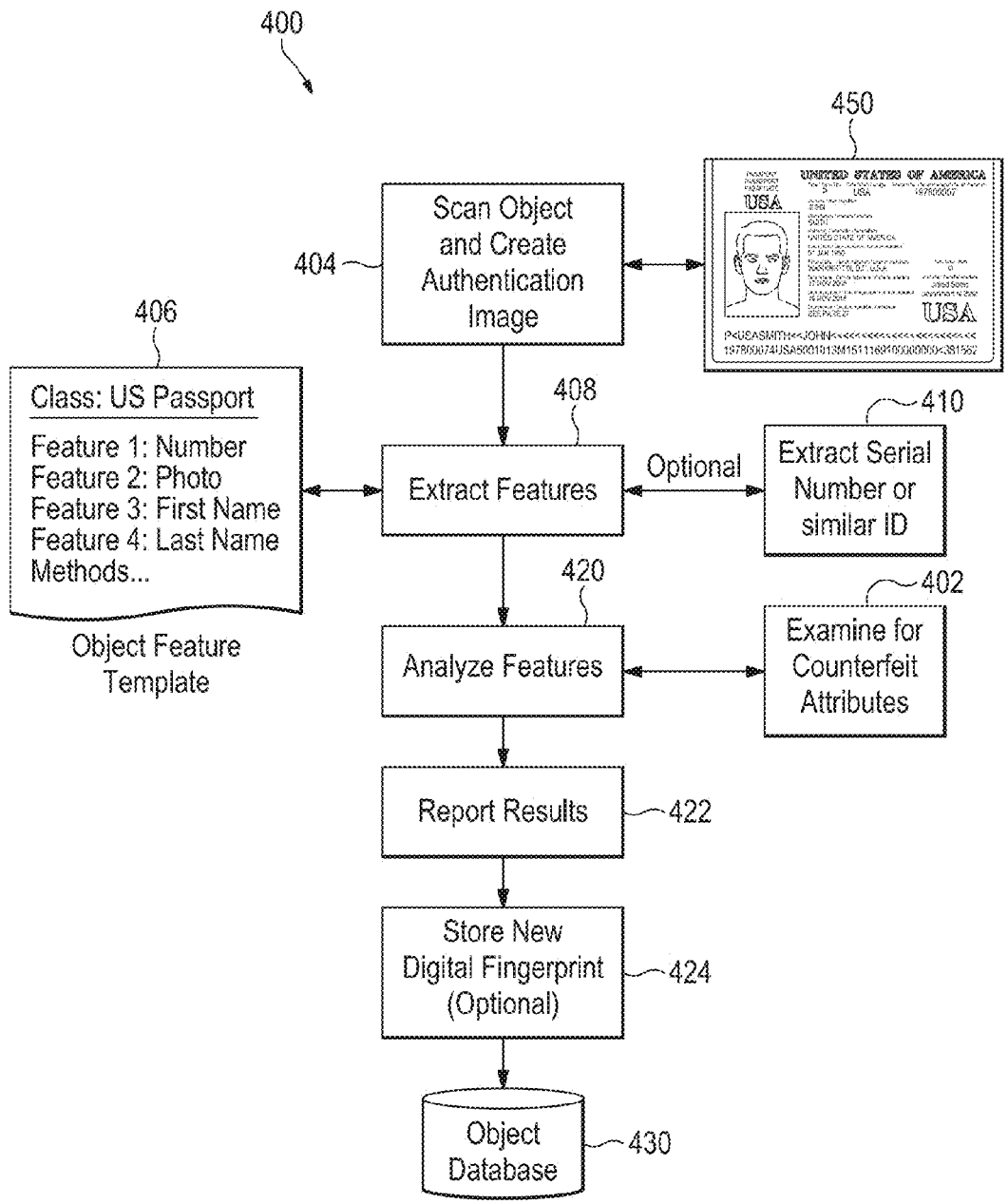
FIG. 4 is a simplified flow diagram illustrating a process for object inspection to detect evidence of counterfeits.

Case #3: For inspection of the specific features of an object that has not been previously fingerprinted to determine whether the features have been altered, the following steps may be followed, referring now to FIG. 4.

The system scans the object, block 404, and creates an authentication image 450 that includes at least one authentication region. The authentication region (or regions) may be determined automatically by the system, or by utilizing the authentication region definitions defined in a stored Object Feature Template 406 as noted earlier. Either way, the process next extracts features from the authentication region(s), block 408, and a digital fingerprint is created. This will typically be in the form of feature vectors, but other data structures may be used as appropriate.

The features of the object are then analyzed, block 420, and examined for attributes indicative of a counterfeit, block 402. Methods may be applied to the features by running programs that are listed in the Object Feature Template that check features for signs of counterfeiting. Features can also be statistically compared to features of other objects of the same class that are stored in the database using Bayesian algorithms or other methods to find suspect variations that the standard methods may not catch. Optionally, a serial number or similar ID may be extracted, block 410.

The system preferably reports whether the object shows signs of alteration or counterfeiting, block 422. The system may then store the digital fingerprint of the object to be inspected, block 424, in the database 430 along with the results of the inspection process. Normally only the extracted features will be stored in the database, but the authentication image and/or the original image may be stored in the database for archival or audit purposes.

Figure 5:
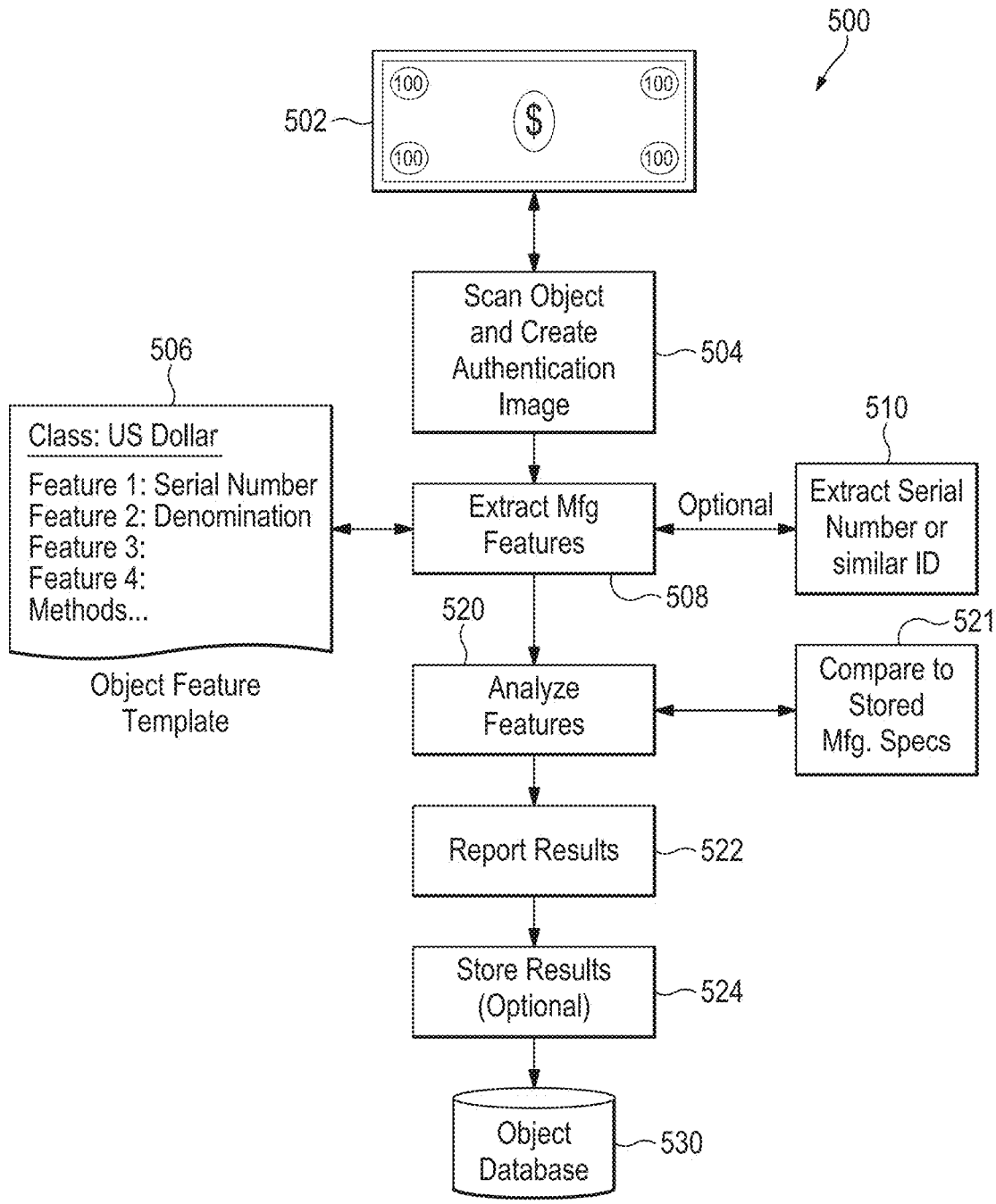
FIG. 5 is a simplified flow diagram illustrating an object manufacturing inspection process.

Case #4: For inspection of an object to determine whether it was manufactured in conformance with the manufacturer's specification, the following steps are followed; referring now to FIG. 5. The authentication region (or regions) for an object 502 is determined by utilizing the authentication region definitions stored in an Object Feature Template 506. In this illustration, the object 502 is a U.S. $100 bill. Scanning and creation of an authentication image are indicated at process block 504.

The manufacturing features are extracted from the regions of interest, block 508, and the digital fingerprint is created (not shown). This will typically be in the form of feature vectors for the manufacturing features, but other data structures may be used as appropriate. Optionally, a unique identifier such as a serial number may be extracted, block 510, and stored to be used to augment subsequent search and identification functions.

Next, the digital fingerprint of the manufacturing features of the object to be checked is are analyzed, block 520, and compared to a fingerprint of the manufacturing features from a reference object (i.e., a perfect manufactured object) stored in the database, illustrated at block 521. In other words, in some embodiments, a reference object may be "fingerprinted" and used as a proxy for manufacture specifications. In other cases, the digital fingerprint of the object, and more specifically the extracted feature vectors, may be compared to reference feature vectors that are based on manufacture specifications. This type of comparison speaks to quality of the object, but may not indicate provenance.

The system reports, block 522, whether the manufactured object meets specifications; i.e. whether the digital fingerprint of the manufacturing features sufficiently match those stored in the database from the reference object. The system may then store the digital fingerprint of the manufacturing features in the database 530, process block 524, along with the results of the manufacturing inspection process. Normally only the extracted manufacturing features will be stored in the database, but the manufacturing inspection image and/or the original image may be stored in the database for archival or audit purposes.

Because in all of the above cases we may be extracting features from images produced under variable lighting conditions, it is highly unlikely two different "reads" will produce the exact same digital fingerprint. In a preferred embodiment, the system is arranged to look up and match items in the database when there is a "near miss." For example, two feature vectors [0, 1, 5, 5, 6, 8] and [0, 1, 6, 5, 6, 8] are not identical but by applying an appropriate difference metric the system can determine that they are close enough to say that they are from the same item that has been seen before. One example is to calculate Euclidean distance between the two vectors in multi-dimensional space, and compare the result to a threshold value. This is similar to the analysis of human fingerprints. Each fingerprint taken is slightly different, but the identification of key features allows a statistical match with a high degree of certainty.

Figure 7:
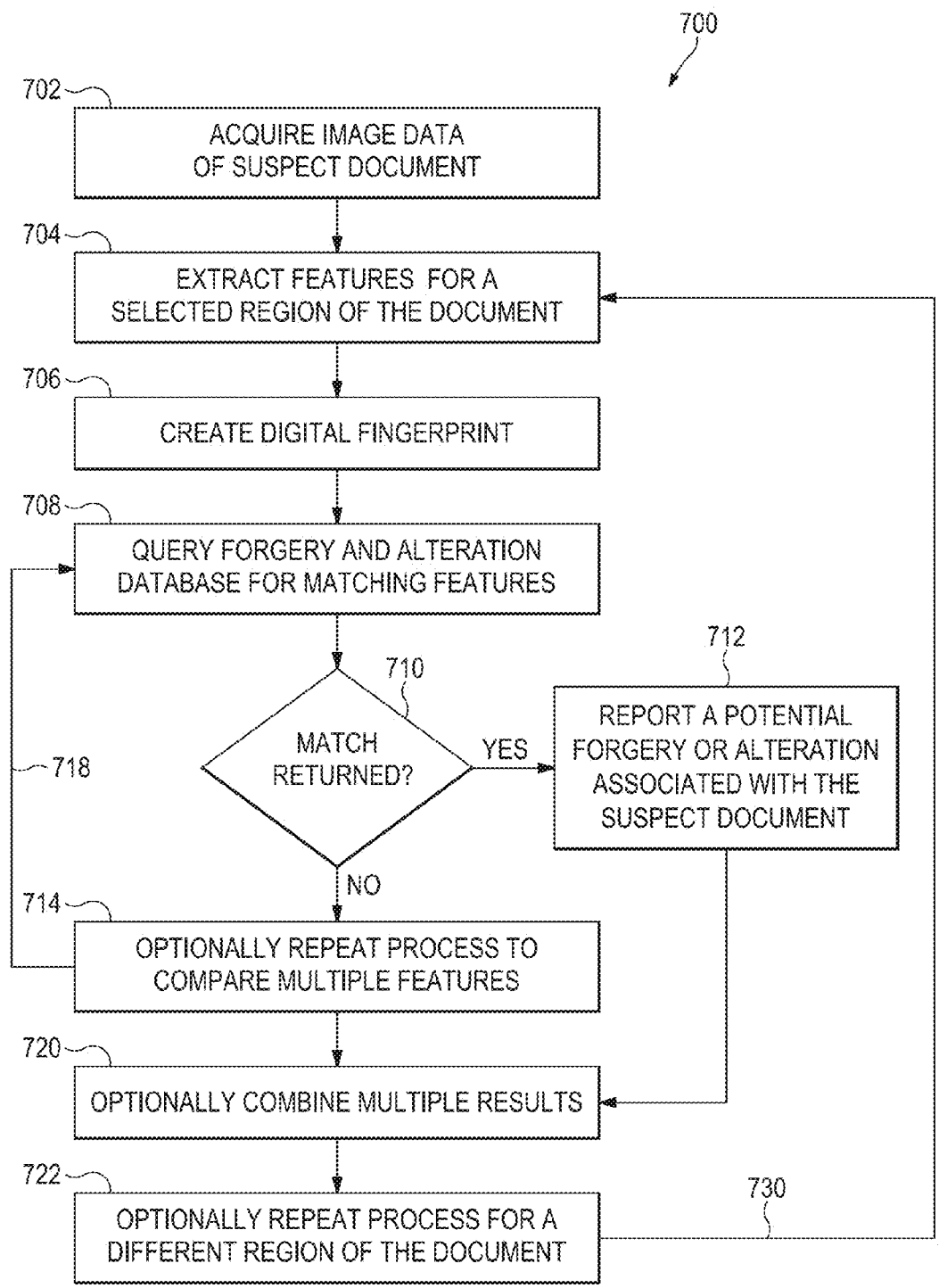
FIG. 7 is a simplified flow diagram illustrating a method for using a digital fingerprint of a suspect document to detect a potential forger or alteration associated with the document.
Figure 8:
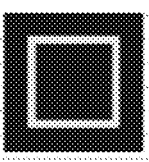
FIG. 8 is a simplified diagram of a prior art bitmap comparison method for comparing images.
Figure 9:
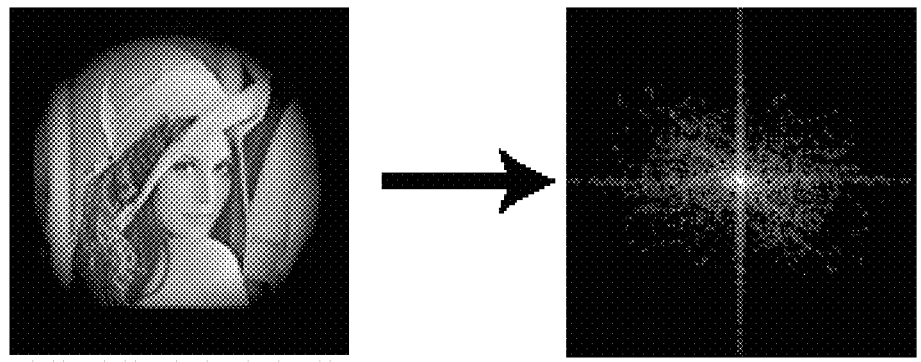
FIG. 9 is an example of a photograph and an image created by Fast Fourier Transform (FFT) of the image data.

FIG. 7 is a simplified flow diagram illustrating a method 700 for using a digital fingerprint of a suspect document to detect a potential forgery or alteration associated with the document. First, image data is acquired of a suspect document, block 702. Then the process extracts features from a selected region of the document, block 704. The extracted features are used to form a digital fingerprint, block 706. Next the digital fingerprint or the extracted features are used to form a query, and the query is used to access a forgery/alteration database in search of a matching record, block 708. If a matching record is returned, decision block 710, then the system may report a potential forgery or alteration associated with the suspect document, block 712. Optionally, multiple results may be combined in reaching a conclusion, block 720, where such are available.

Referring again to decision block 710, if no match is returned (i.e. no record matches the query criteria within a selected tolerance or confidence), then the process optionally may be repeated, block 714, for comparison to additional database records. In other words, the database search may be expanded, see loop 718. Again, multiple query results may be combined. Further, the entire process, defined by loop 730, may be repeated for inspecting and analyzing additional or different regions of the document, block 722. As discussed earlier, multiple regions of interest may be defined. Terminal conditions, not shown, may be implemented.

FIG. 10 is an illustration of an example of feature extraction from a digital image. The original image data, on the left, is searched by any of various software processes to detect and locate a feature in the image. In this case, the only important shape in this image is a square, and it extracts that feature, as shown in the middle of the figure, with "1" pixel values. (Most real implementations will have greater than one-bit pixel values.) Then, the extracted fingerprint feature may be stored as a feature vector as illustrated on the right side of the figure. A feature vector is an n-dimensional vector of numerical values that represent the shape.

In this approach, we may store only the features, not the entire image. In fact, after feature extraction the original image can be discarded. This has obvious advantages in terms of reduced storage requirements. Typical algorithms used for extracting features include but are not limited to edge detection, corner detection, blob detection, wavelet features; Gabor, gradient and steerable output filter histograms, scale-invariant feature transformation, active contours, shape contexts and parameterized shapes.

Referring now to FIG. 11, it illustrates essentially the same process for accessing a comparison or candidate image, extracting features from that image, and again storing each of them as a feature vector. Note that the example above is presented solely for the purpose of explanation, and actual implementations will vary. For instance, many shapes can be parameterized and stored even more efficiently. Instead of storing all the pixels along the boundaries, the square in FIG. 10 could actually just be stored as the lower left and upper right corner points ((x1, y1), (x2, y2)). Similarly, a circle could be stored with just the center point and radius. Feature vectors can store a wide variety of n-dimensional representations such as point, lines, polylines, edges, ridges, histograms and many others.

Once the features are extracted from the original image and the candidate image, the features can be compared directly to determine if there is a match. Typical algorithms for comparing features include but are not limited to nearest neighbor, hashing, indexing feature sets with visual vocabularies, support vector machines, multilayer perceptron and random forests and ferns. A comparison of these feature vectors is illustrated in FIG. 12, resulting in a match.

Figure 13A:
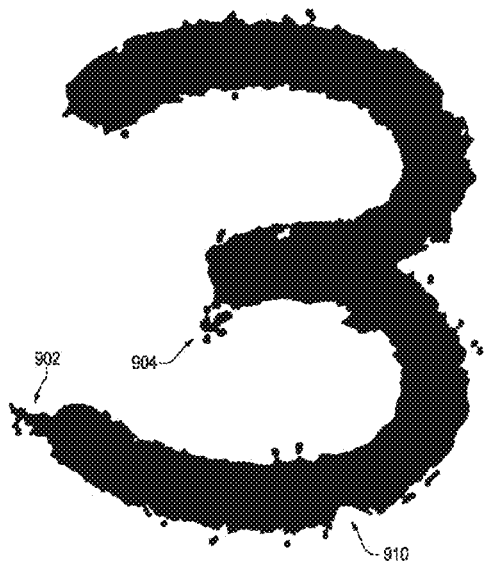
FIG. 13A shows an image of the numeral "3" representing the first digit in a serial number of an "original" or known U.S. dollar bill.

FIG. 13A illustrates an image of the numeral "3" representing a number printed on an "original" or known U.S. dollar bill. This bill may have been fingerprinted, for example, at the time of manufacture or public release, as described herein. As noted below, fingerprint databases of currency and the like may be secured. And such databases preferably exclude raw image data. This image, on the order of about 40× magnification, shows a couple of distinctive features visible to the naked eye.

Figure 13B:
FIG. 13B shows an image of the numeral "3" representing the first digit in a serial number a U.S. dollar bill to be authenticated.

FIG. 13B illustrates an image of a number printed on a second or unknown U.S. dollar bill. This second bill may be fingerprinted using the same process, and then the resulting digital fingerprints, i.e., the respective fingerprint feature vectors, may be compared as further explained below, to determine whether or not the second bill is in fact the same one as the first bill, even though it may have changed from wear and tear.

FIG. 14A is a simplified illustration of the results of feature extraction applied to the numeral 3 of FIG. 13A. (Only the ends of the numeral are shown.) Two areas of interest are called out by circles 1720 and 1750. Below we discuss how these areas may be selected in an image. Fingerprint feature extraction is applied to each of these circular regions. The results for each location are stored in fingerprint feature vectors. A collection of feature vectors, say for location 1750, may be stored as a feature vector array. FIG. 14B is a simplified illustration of the results of feature extraction applied to the numeral 3 of FIG. 13B. The same fingerprinting process is applied to this image. The same locations of interest as in FIG. 14A are labeled 1720 and 1760, respectively. Then the stored features (from the original object) are compared with the features extracted from the new object. As in this case, if the features are not encountered in the second object, it is not a match.

Figure 15A:
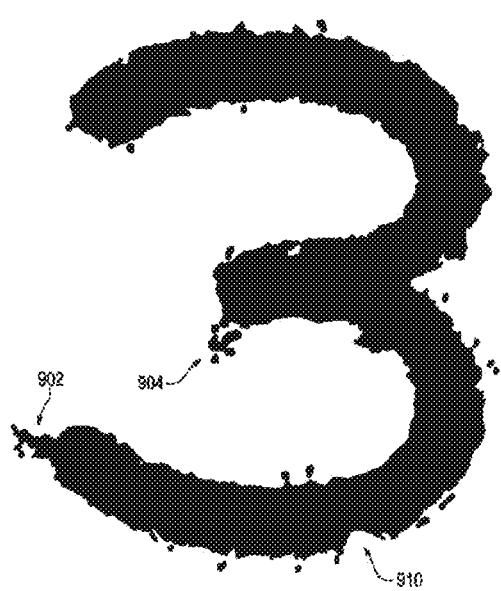
FIG. 15A shows the same dollar bill image as in FIG. 13A, juxtaposed with FIG. 15B for comparison.
Figure 15B:
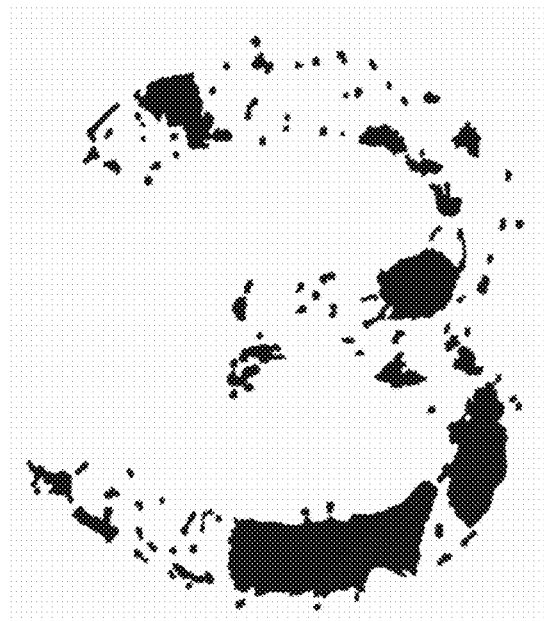
FIG. 15B shows an image of the numeral "3" that has been damaged or degraded.

One of the key advantages to the feature-based method is that when the object is very worn from handling or use, the system can still identify the object as original, which may be impossible with the bitmapped approach. FIG. 15A shows the same dollar bill image as in FIG. 13A, juxtaposed with FIG. 15B for comparison. FIG. 15B shows the same bill after machine washing, perhaps in someone's pocket.

In FIG. 15B, the image (actually the dollar bill) has been degraded; there is significant loss of ink and destruction of the paper surface in multiple locations. A bit mapped approach would clearly fail to match up here, as the number of pixels that are different is significant—only relatively few of the pixels are the same as the original.

FIG. 16A shows the detail of two fingerprint feature locations as before, 1610 and 1650. FIG. 16B shows detail of the damaged bill with the corresponding locations called out as 1620 and 1660, respectively. Here, one can see visually why a comparison of the corresponding fingerprint feature vectors would be adequate to result in a match. In practice, a much larger number of features would be used.

The image of the damaged bill is analyzed by a processor. The processor accesses a database of previously stored fingerprint data. If the dollar bill serial number is legible (by eye or machine), the record for the corresponding bill may be accessed from the datastore using the serial number as an index. Similarly, if any portion of the serial number is legible, the search for a matching record can be narrowed on that basis. Either way, a candidate record, containing a set of stored regions of interest may be compared to the suspect image.

As explained above, in addition to being able to recognize a worn object, the feature-based approach can deal with problems like rotated images. This is especially important in a system where the retail customer may be taking a picture of an object to be authenticated. In this case external factors like lighting and rotation are not under the manufacturer's control.

Figure 17:
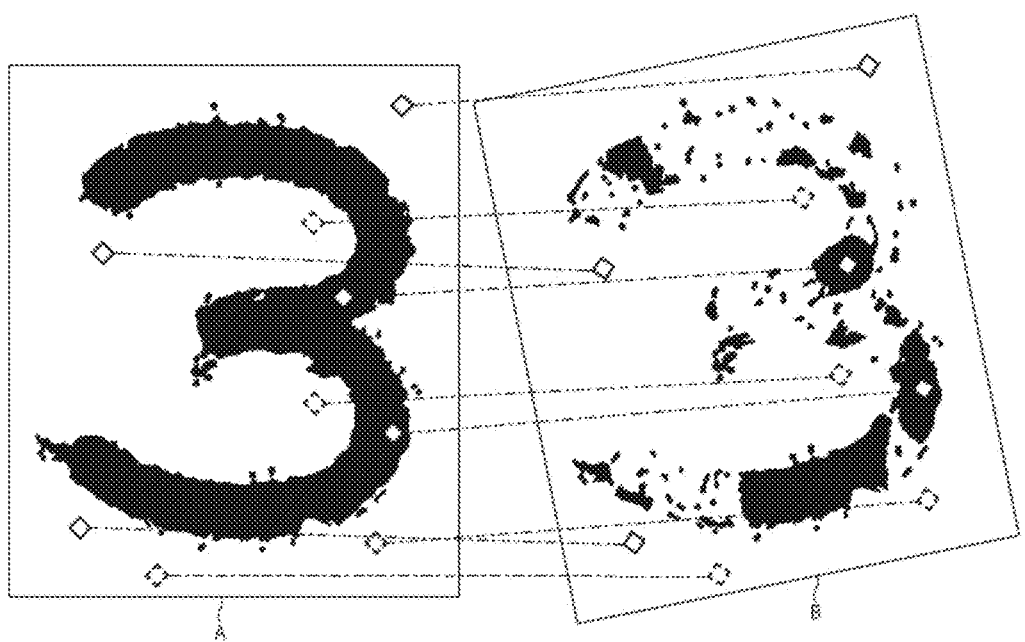
FIG. 17 is a simplified illustration of a rotational transformation in the process of comparing digital fingerprints of two images.

Referring now to FIG. 17, it shows the original image on the left side, with a small set of fingerprint features marked as small diamond shapes. This is merely a callout symbol for illustration. In a preferred implementation, as noted, circular areas are used. For each feature (preferably identified in the database record), a search is conducted of the suspect image on the right side of FIG. 17 for a matching feature. The position may not match exactly, due to "stretch"—an effective difference in magnification, and/or due to rotation of the image. Although it may not match locations literally; a mathematical transformation can be defined that maps one image to the other, thereby accounting for rotation and stretch as appropriate. Thus, a bounding rectangle A indicated by the box in the left side image may be mapped to a quadrilateral indicated by the line B in the right side image.

Once an appropriate transformation is found, further matching can be done to increase the level of confidence of the match if desired. In some applications, a number of matches on the order of tens or hundreds of match points is sufficient. On the other hand, the number of non-match points also should be taken into account. That number should be relatively very low, but it may be non-zero due to random dirt, system "noise" and the like. Preferably, the allowed mapping or transformation should be restricted depending on the type of objects under inspection. For instance, some objects may be inflexible, which may restrict the possible deformations of the object.

To summarize the imaging requirements for a typical fingerprinting system, for example for inspecting documents, it should provide sufficient imaging capability to show invariant features. The particulars will depend on the regions used for authentication. For many applications, 10× magnification is adequate. For ink bleeds on passports, bills and other high-value authentication, 40× power is more than sufficient. In preferred embodiments, the software should implement a flexible response to accommodate misalignment (rotation), orientation and scale changes. Color imaging and analysis is generally not required for using the processes described above.

Hardware and Software

Most of the equipment discussed above comprises hardware and associated software. For example, the typical portable device is likely to include one or more processors and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there typically will be a corresponding software product at the transmitting end of the transmission, or the receiving end, or both.

Integration with Bill Processing Equipment

We propose creation of fingerprint data at the U.S. Treasury or any other producer (printer) of negotiable bills or notes. Preferably, such a system utilizes random, microscopic features unique to each bill's paper and printing. For example, the system may extract features from unpublished locations on the bills. In other words, the specific locations used for authentication are maintained in secrecy. The extracted features may be converted into encrypted feature vectors and associated in a data store with the corresponding bill serial number (the serial number having been readily captured by the same scanner or a separate one). In this way, a protected database may be created that is addressable or searchable by serial number or feature vector, but only by authorized users. (Here, a "user" may be a machine with electronic access to the database.)

Equipment is known for stacking, counting, and "strapping" paper money notes. A "strap" is a package of 100 notes, held together by a single paper band, as required for deposit by U.S. Federal Reserve rules. Various note handling equipment may be modified to include a digital scanner, for example, an optical scanner, to capture images of each bill or note as it is processed. The scanner may be coupled to a suitable processor, as explained above, for storing the captured images, and for processing the images to authenticate them and/or to detect counterfeit items.

Preferably, such a system is granted access to the protected database that is searchable by serial number or digital fingerprint. It may then look up each bill scanned, and compare features of the digital image to the digital fingerprint stored in protected database for the corresponding serial number. This process may be done by batch or in real time or near real time. The comparison, as further described above, may provide a confidence metric, or a simple yes/no (authentic/counterfeit) result for each note. It may identify a counterfeit note by serial number, but also by sequence number to facilitate locating the bill ("the 28$^{th}$ bill in the strap #218"). In this way, a bank or other institution can detect counterfeit notes in a timely manner.

In another embodiment, a scanner, which may be portable and optionally wireless, may be made available at a bank teller station for the teller to authenticate bills presented for deposit or exchange. Further, such a system may be installed at an ATM machine to automatically authenticate bills presented for deposit. The ATM may be programmed to accept the bills to get them "off the street" but flag them as counterfeit or suspect.

The term "note" is commonly used in the U.K. with regard to paper money, while the term "bill" is more common in the U.S. We use them interchangeably here. Not to be confused with U.S. Treasury "bills" and "notes" which are not currency but debt instruments. That said, the inventions disclosed herein are applicable to those as well as currency, although nowadays such things are mainly processed by electronic "book entries" rather than paper documents. Older U.S. Savings Bonds, and any other bearer instruments in any country, can all be authenticated by various embodiments of the present invention.

Having described and illustrated the principles of the disclosure and some illustrative embodiments thereof, it should be apparent that the invention may be modified in arrangement and detail without departing from such principles. For convenience, we summarize below some aspects of the disclosure. The following list is merely illustrative and not intended to limit or define all the inventions disclosed. The scope of the present invention should, therefore, be determined only by the following claims.

The invention claimed is:

1. A computer-implemented method comprising:
   acquiring digital fingerprints of a plurality of known counterfeit physical objects of a given class;
   storing each digital fingerprint of a corresponding counterfeit physical object in a digital fingerprint record of a datastore to form a machine-readable counterfeit object database for the given class, wherein each stored digital fingerprint record includes
   first data identifying a plurality of locations of interest in the corresponding counterfeit physical object and
   for each location of interest, second data forming at least one fingerprint feature vector that describes a fingerprint feature extracted from the location of interest,
   wherein the at least one fingerprint feature vector describes inherent physical characteristics of the corresponding location of interest without regard to semantic content of the location of interest;
   acquiring a digital fingerprint of a target physical object;
   querying the machine-readable counterfeit object database based on the digital fingerprint of the target physical object; and
   based on a response to the querying, generating a report indicating whether or not the target physical object is likely to be a counterfeit.

2. The method of claim 1 wherein the given class of known counterfeit objects is government-issued documents.

3. The method of claim 1 wherein the given class of known counterfeit objects is passports.

4. The method of claim 1 and further comprising:
   searching stored digital fingerprints of the machine-readable counterfeit object database to identify one or more patterns;
   based on the identified one or more patterns, building a database of counterfeiting patterns for objects of a same class.

5. An apparatus to generate a digital fingerprint comprising:
   an image capture device arranged to generate image data responsive to a surface region of a physical object;
   a processor having electronic access to the image data;
   the processor arranged to execute stored instructions for processing the image data, the stored instructions arranged to cause the processor to:
   access a predetermined object feature template associated with a class of objects of which the physical object is a member, wherein the predetermined object feature template specifies (a) an authentication region, (b) at least one object feature within the authentication region, (c) a method for extracting a digital fingerprint feature from the at least one object feature, and (d) a method for comparing the extracted digital fingerprint feature to a reference feature;
   based on the predetermined object feature template, identify a subset of the image data corresponding to the authentication region;
   based on the predetermined object feature template, extract a feature from the subset of the image data; and
   store extracted feature data defining the extracted feature in an object digital fingerprint database record.

6. The apparatus of claim 5 wherein the image capture device comprises at least one of a scanner, a camera, a specially-adapted sensor array from any of a CCD array, an imaging microscope, a smart phone camera, a video camera, an x-ray machine, or any other imaging capture device responsive to electromagnetic radiation.

7. The apparatus of claim 5 wherein the stored instructions further control the processor to compare the extracted feature data to reference feature data, without regard to the image data generated by the image capture device, to assess whether or not the physical object matches the reference feature data.

8. The apparatus of claim 7, wherein the assessment includes quantifying the comparison, to produce a quantified comparison result, and then comparing the quantified comparison result to a predetermined comparison tolerance.

9. The apparatus of claim 7, wherein the extracted feature data defines a geometric shape and a location of the geometric shape in the authentication region.

10. An apparatus to generate a digital fingerprint comprising:

an image capture device arranged to generate image data responsive to a surface region of a physical object;

a processor having electronic access to the image data;

the processor arranged to execute stored instructions for processing the image data, the stored instructions arranged to cause the processor to:

access a predetermined object feature template associated with a class of objects of which the physical object is a member;

based on the predetermined object feature template, identify a subset of the image data corresponding to an authentication region on the surface region of the physical object;

based on the predetermined object feature template, extract a feature from the subset of the image data; and store extracted feature data defining the extracted feature in an object digital fingerprint database record associated with the physical object, wherein the extracted feature data defines a geometric shape and a location of the geometric shape in the authentication region.

* * * * *